US011373675B2

(12) United States Patent
Bai et al.

(10) Patent No.: US 11,373,675 B2
(45) Date of Patent: *Jun. 28, 2022

(54) MAGNETIC HEAD WITH ASSISTED MAGNETIC RECORDING

(71) Applicant: Western Digital Technologies, Inc., San Jose, CA (US)

(72) Inventors: Zhigang Bai, Fremont, CA (US); Anna Zheng, San Jose, CA (US); Venkatesh Chembrolu, Fremont, CA (US); Supradeep Narayana, Santa Clara, CA (US); Yaguang Wei, Pleasanton, CA (US); Suping Song, Fremont, CA (US); Terence Lam, Cupertino, CA (US); Michael Kuok San Ho, Emerald Hills, CA (US); Changqing Shi, San Ramon, CA (US); Lijie Guan, San Jose, CA (US); Jian-Gang Zhu, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/141,068

(22) Filed: Jan. 4, 2021

(65) Prior Publication Data
US 2021/0125631 A1 Apr. 29, 2021

Related U.S. Application Data

(63) Continuation of application No. 16/252,419, filed on Jan. 18, 2019, now Pat. No. 10,891,975.
(Continued)

(51) Int. Cl.
G11B 5/115 (2006.01)
G11B 5/31 (2006.01)
(Continued)

(52) U.S. Cl.
CPC ............ *G11B 5/115* (2013.01); *G11B 5/1278* (2013.01); *G11B 5/187* (2013.01); *G11B 5/3116* (2013.01)

(58) Field of Classification Search
CPC ..... G11B 5/1278; G11B 5/3116; G11B 5/315; G11B 5/3146; G11B 5/3967; G11B 5/23; G11B 5/3133; G11B 5/187
See application file for complete search history.

(56) References Cited

U.S. PATENT DOCUMENTS

| 4,822,159 A | 4/1989 | Gaiser |
| 4,881,143 A | 11/1989 | Bhattacharyya et al. |
| (Continued) | | |

FOREIGN PATENT DOCUMENTS

| CN | 104835510 B | 11/2017 |
| JP | 2013251042 A | 12/2013 |
| WO | 2015126326 A1 | 8/2015 |

OTHER PUBLICATIONS

Kanai, Yasushi et al.: "Micromagnetic Model Simulations Considering Write Head, Spin-Torque Oscillator, and Double-Layered Medium Altogether"; Nigata Institute of Technology; IEEE Transactions on Magnetics; Sep. 2018; http:tmrc2018.ucsd.edu/Archive/C2.pdf (2 pages).
(Continued)

*Primary Examiner* — Brian E Miller
(74) *Attorney, Agent, or Firm* — Patterson + Sheridan, LLP; Steven H. VerSteeg

(57) ABSTRACT

A magnetic head includes a main pole configured to serve as a first electrode, an upper pole containing a trailing magnetic shield configured to a serve as a second electrode, and an electrically conductive portion located in a trailing gap between the main pole and the trailing magnetic shield. The electrically conductive portion is not part of a spin torque oscillator stack, and the electrically conductive portion
(Continued)

includes at least one electrically conductive, non-magnetic material layer. The main pole and the trailing magnetic shield are electrically shorted by the electrically conductive portion across the trailing gap between the main pole and the trailing magnetic shield such that an electrically conductive path is present between the main pole and the trailing magnetic shield through the electrically conductive portion.

19 Claims, 25 Drawing Sheets

Related U.S. Application Data

(60) Provisional application No. 62/743,110, filed on Oct. 9, 2018.

(51) Int. Cl.
*G11B 5/127* (2006.01)
*G11B 5/187* (2006.01)

(56) References Cited

U.S. PATENT DOCUMENTS

| | | | |
|---|---|---|---|
| 5,784,224 A | 7/1998 | Rottmayer et al. | |
| 6,493,183 B1 | 12/2002 | Kasiraj et al. | |
| 6,636,393 B1 | 10/2003 | Araki et al. | |
| 6,661,623 B1 | 12/2003 | Tsuchiya et al. | |
| 6,820,022 B2 | 11/2004 | Popp et al. | |
| 7,072,142 B2 | 7/2006 | Lam | |
| 7,397,633 B2 | 7/2008 | Xue et al. | |
| 7,983,002 B2 | 7/2011 | Pust et al. | |
| 8,107,352 B1 | 1/2012 | Yamanaka et al. | |
| 8,116,031 B2 | 2/2012 | Alex et al. | |
| 8,159,781 B2 | 4/2012 | Taguchi et al. | |
| 8,189,292 B2 | 5/2012 | Pentek et al. | |
| 8,194,361 B2 | 6/2012 | Kudo et al. | |
| 8,230,571 B2 | 7/2012 | Kovac | |
| 8,238,059 B1 | 8/2012 | Tang et al. | |
| 8,320,080 B1* | 11/2012 | Braganca | H01F 10/329 360/128 |
| 8,339,736 B2 | 12/2012 | Gao et al. | |
| 8,355,222 B2 | 1/2013 | Mino et al. | |
| 8,390,955 B1 | 3/2013 | Sasaki et al. | |
| 8,404,128 B1 | 3/2013 | Zhang et al. | |
| 8,405,930 B1 | 3/2013 | Li et al. | |
| 8,422,159 B2 | 4/2013 | Gao et al. | |
| 8,456,967 B1 | 6/2013 | Mallary | |
| 8,472,135 B1 | 6/2013 | Kusukawa et al. | |
| 8,508,984 B2 | 8/2013 | Ranjan et al. | |
| 8,547,661 B2 | 10/2013 | Bai | |
| 8,553,362 B2 | 10/2013 | Tanabe et al. | |
| 8,582,240 B1 | 11/2013 | Chen et al. | |
| 8,634,163 B2 | 1/2014 | Tanabe et al. | |
| 8,767,346 B2 | 7/2014 | Yamada et al. | |
| 8,786,984 B2 | 7/2014 | Das et al. | |
| 8,810,961 B2 | 8/2014 | Taguchi et al. | |
| 8,837,088 B1 | 9/2014 | Kimura et al. | |
| 8,908,330 B1 | 12/2014 | Mallary | |
| 8,929,030 B2 | 1/2015 | Hou et al. | |
| 8,930,955 B2 | 1/2015 | Baset et al. | |
| 8,988,826 B2 | 3/2015 | Sugiyama et al. | |
| 8,995,088 B1 | 3/2015 | Boone et al. | |
| 9,042,151 B2 | 5/2015 | Annunziata et al. | |
| 9,047,887 B2 | 6/2015 | Funayama | |
| 9,099,102 B2 | 8/2015 | Katada et al. | |
| 9,129,621 B1 | 9/2015 | Kimura et al. | |
| 9,142,227 B1 | 9/2015 | Etoh et al. | |
| 9,230,568 B1 | 1/2016 | Ikegawa et al. | |
| 9,230,571 B1 | 1/2016 | Chen et al. | |
| 9,230,573 B1* | 1/2016 | Etoh | G11B 5/3146 |
| 9,275,672 B2 | 3/2016 | Shiroishi et al. | |
| 9,286,916 B1 | 3/2016 | Rivkin et al. | |
| 9,311,934 B1 | 4/2016 | Shiimoto et al. | |
| 9,368,135 B2* | 6/2016 | Gao | G11B 5/315 |
| 9,390,733 B2 | 7/2016 | Etoh et al. | |
| 9,406,316 B2 | 8/2016 | Urakami et al. | |
| 9,449,621 B1 | 9/2016 | Mauri et al. | |
| 9,551,637 B2 | 1/2017 | Fox et al. | |
| 9,589,581 B2 | 3/2017 | Takagishi et al. | |
| 9,640,203 B1 | 5/2017 | Buch et al. | |
| 9,640,206 B1 | 5/2017 | Saito et al. | |
| 9,691,415 B2 | 6/2017 | Koui | |
| 9,747,932 B1 | 8/2017 | Taguchi et al. | |
| 9,870,786 B2 | 1/2018 | Funayama et al. | |
| 9,881,637 B1 | 1/2018 | Wilson et al. | |
| 10,014,012 B1 | 7/2018 | Song et al. | |
| 10,121,497 B1 | 11/2018 | Takahashi et al. | |
| 10,186,284 B2 | 1/2019 | Narita et al. | |
| 10,210,888 B1 | 2/2019 | Li et al. | |
| 10,236,021 B2 | 3/2019 | Narita et al. | |
| 10,276,193 B2 | 4/2019 | Narita et al. | |
| 10,325,618 B1 | 6/2019 | Wu et al. | |
| 10,366,714 B1 | 7/2019 | Olson et al. | |
| 10,679,650 B2* | 6/2020 | Bai | G11B 5/23 |
| 10,762,917 B1* | 9/2020 | Le | G11B 5/3116 |
| 10,839,844 B1 | 11/2020 | Asif Bashir et al. | |
| 10,891,974 B1* | 1/2021 | Chembrolu | G11B 5/23 |
| 10,891,975 B1* | 1/2021 | Bai | G11B 5/1278 |
| 11,017,802 B2* | 5/2021 | Chembrolu | G11B 5/314 |
| 2001/0020884 A1 | 9/2001 | Araki et al. | |
| 2003/0112555 A1 | 6/2003 | Sato et al. | |
| 2004/0145850 A1 | 7/2004 | Fukumoto et al. | |
| 2005/0058855 A1 | 3/2005 | Girt | |
| 2005/0128637 A1 | 6/2005 | Johnston et al. | |
| 2005/0219748 A1 | 10/2005 | Guthrie et al. | |
| 2005/0219758 A1 | 10/2005 | Roth | |
| 2006/0067016 A1 | 3/2006 | Childress et al. | |
| 2006/0215315 A1 | 9/2006 | Miyake et al. | |
| 2007/0121249 A1 | 5/2007 | Parker | |
| 2007/0297081 A1 | 12/2007 | Nazarov et al. | |
| 2008/0112087 A1 | 5/2008 | Clinton et al. | |
| 2008/0268291 A1 | 10/2008 | Akiyama et al. | |
| 2008/0304176 A1 | 12/2008 | Takagishi et al. | |
| 2009/0009907 A1 | 1/2009 | Zhang et al. | |
| 2009/0016266 A1 | 1/2009 | Kim et al. | |
| 2009/0059423 A1 | 3/2009 | Yamada et al. | |
| 2009/0080120 A1 | 3/2009 | Funayama et al. | |
| 2009/0168266 A1 | 7/2009 | Sato et al. | |
| 2009/0262636 A1 | 10/2009 | Xue et al. | |
| 2009/0310244 A1 | 12/2009 | Shimazawa et al. | |
| 2010/0290156 A1 | 11/2010 | Anderson | |
| 2010/0315747 A1 | 12/2010 | Matsumoto et al. | |
| 2011/0090584 A1 | 4/2011 | Franca-Neto et al. | |
| 2011/0134561 A1* | 6/2011 | Smith | G11B 5/3133 360/59 |
| 2011/0216432 A1 | 9/2011 | Yanagisawa | |
| 2011/0216435 A1 | 9/2011 | Shiimoto et al. | |
| 2011/0293967 A1 | 12/2011 | Zhang et al. | |
| 2012/0044598 A1 | 2/2012 | Bai et al. | |
| 2012/0147502 A1 | 6/2012 | Udo et al. | |
| 2013/0016441 A1 | 1/2013 | Taguchi et al. | |
| 2013/0050875 A1 | 2/2013 | Yamada et al. | |
| 2013/0063837 A1 | 3/2013 | Udo et al. | |
| 2013/0146997 A1 | 6/2013 | Lee et al. | |
| 2013/0149499 A1 | 6/2013 | Lee et al. | |
| 2013/0250456 A1 | 9/2013 | Yamada et al. | |
| 2013/0251042 A1 | 9/2013 | Lee | |
| 2013/0271869 A1 | 10/2013 | Taguchi et al. | |
| 2013/0336045 A1 | 12/2013 | Kuo et al. | |
| 2014/0044598 A1 | 2/2014 | Hu et al. | |
| 2014/0078618 A1 | 3/2014 | Matsumoto et al. | |
| 2014/0139952 A1 | 5/2014 | Takeo et al. | |
| 2014/0146420 A1 | 5/2014 | Shimizu et al. | |
| 2014/0175050 A1 | 6/2014 | Zhang et al. | |
| 2014/0175575 A1 | 6/2014 | Doyle et al. | |
| 2014/0177100 A1 | 6/2014 | Sugiyama et al. | |
| 2015/0029615 A1 | 1/2015 | Chembrolu | |
| 2015/0043106 A1 | 2/2015 | Yamada et al. | |
| 2015/0098150 A1 | 4/2015 | Chiu et al. | |
| 2015/0103434 A1 | 4/2015 | Etoh et al. | |
| 2015/0103437 A1 | 4/2015 | Watanabe et al. | |

(56) References Cited

U.S. PATENT DOCUMENTS

| | | | |
|---|---|---|---|
| 2015/0109699 A1* | 4/2015 | Boone | G11B 5/3116 360/75 |
| 2015/0126326 A1 | 5/2015 | Kobayashi et al. | |
| 2015/0154987 A1 | 6/2015 | Etoh et al. | |
| 2015/0213814 A1 | 7/2015 | Chembrolu et al. | |
| 2015/0213820 A1 | 7/2015 | Chembrolu et al. | |
| 2015/0380017 A1 | 12/2015 | Chembrolu et al. | |
| 2016/0024755 A1 | 1/2016 | Kobiki | |
| 2016/0027455 A1 | 1/2016 | Kudo et al. | |
| 2016/0035375 A1 | 2/2016 | Gao | |
| 2016/0148629 A1 | 5/2016 | Gao et al. | |
| 2016/0225392 A1 | 8/2016 | Takeo et al. | |
| 2016/0300999 A1 | 10/2016 | Yi et al. | |
| 2016/0343391 A1 | 11/2016 | Sasaki et al. | |
| 2017/0018285 A1 | 1/2017 | Chen et al. | |
| 2017/0061995 A1 | 3/2017 | Taguchi et al. | |
| 2017/0104151 A1 | 4/2017 | Banerjee et al. | |
| 2017/0140779 A1 | 5/2017 | Koui | |
| 2017/0148471 A1 | 5/2017 | Tabata et al. | |
| 2017/0148474 A1 | 5/2017 | Okamura et al. | |
| 2017/0236537 A1 | 8/2017 | Murakami et al. | |
| 2017/0309301 A1 | 10/2017 | Takahashi et al. | |
| 2018/0247668 A1 | 8/2018 | Biskeborn et al. | |
| 2018/0266848 A1 | 9/2018 | Das et al. | |
| 2018/0268848 A1 | 9/2018 | Narita et al. | |
| 2019/0088274 A1 | 3/2019 | Narita et al. | |
| 2019/0180779 A1 | 6/2019 | Biskeborn et al. | |
| 2019/0251991 A1 | 8/2019 | Le et al. | |
| 2019/0259413 A1 | 8/2019 | Le et al. | |
| 2019/0267029 A1 | 8/2019 | Bai et al. | |
| 2019/0279666 A1* | 9/2019 | Freitag | G11B 5/3909 |
| 2019/0279668 A1* | 9/2019 | Freitag | G11B 5/1278 |
| 2020/0005815 A1 | 1/2020 | Bai et al. | |
| 2020/0090658 A1 | 3/2020 | Shin et al. | |
| 2020/0090685 A1 | 3/2020 | Takagishi et al. | |
| 2020/0152228 A1* | 5/2020 | Tang | G11B 5/147 |
| 2020/0294535 A1 | 9/2020 | Narita et al. | |

OTHER PUBLICATIONS

Y. Kanai et al.: "Micromagnetic Model Analysis of Various Spin Torque Oscillators with Write Head for Mircowave-assisted Magnetic Recording" IEEE International Magnetics Conference; Dublin, Ireland Apr. 24-28, 2017; https://eeexplore.ieee.org/document/8007581 (2 pages).

U.S. Appl. No. 16/252,315, filed Jan. 18, 2019.

Mallary, Mike et al; "Head and Media Challenges for 3 Tb/in2 Microwave-Assisted Magnetic Recording"; IEEE Transactions on Magnetics, vol. 50, No. 7, Jul. 2014 (8 pages).

U.S. Appl. No. 16/998,989, filed Aug. 20, 2020.

U.S. Appl. No. 16/000,033, filed Jun. 5, 2018.

U.S. Appl. No. 16/000,103, filed Jun. 5, 2018.

* cited by examiner

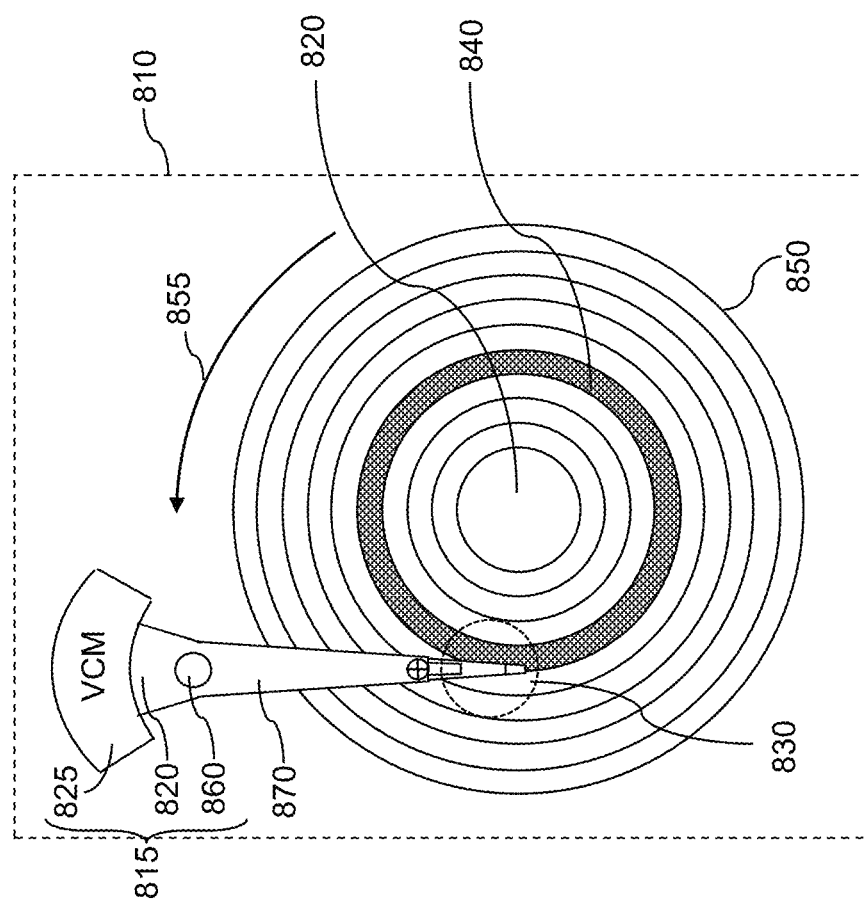
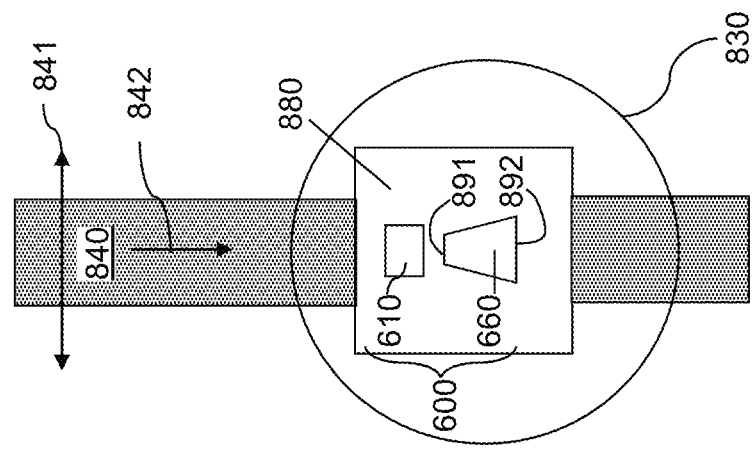
FIG. 2A (Prior Art)
FIG. 2B (Prior Art)

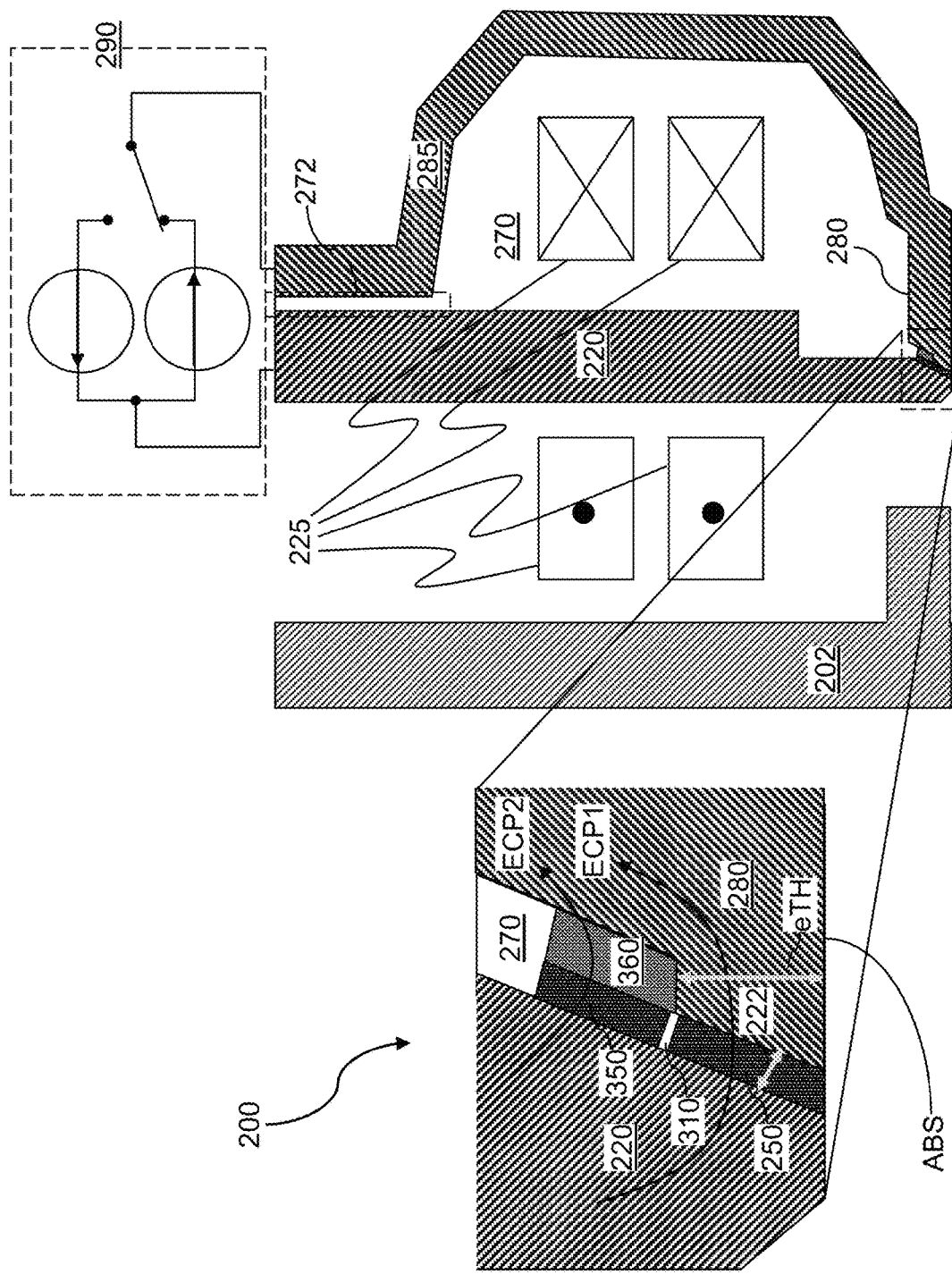

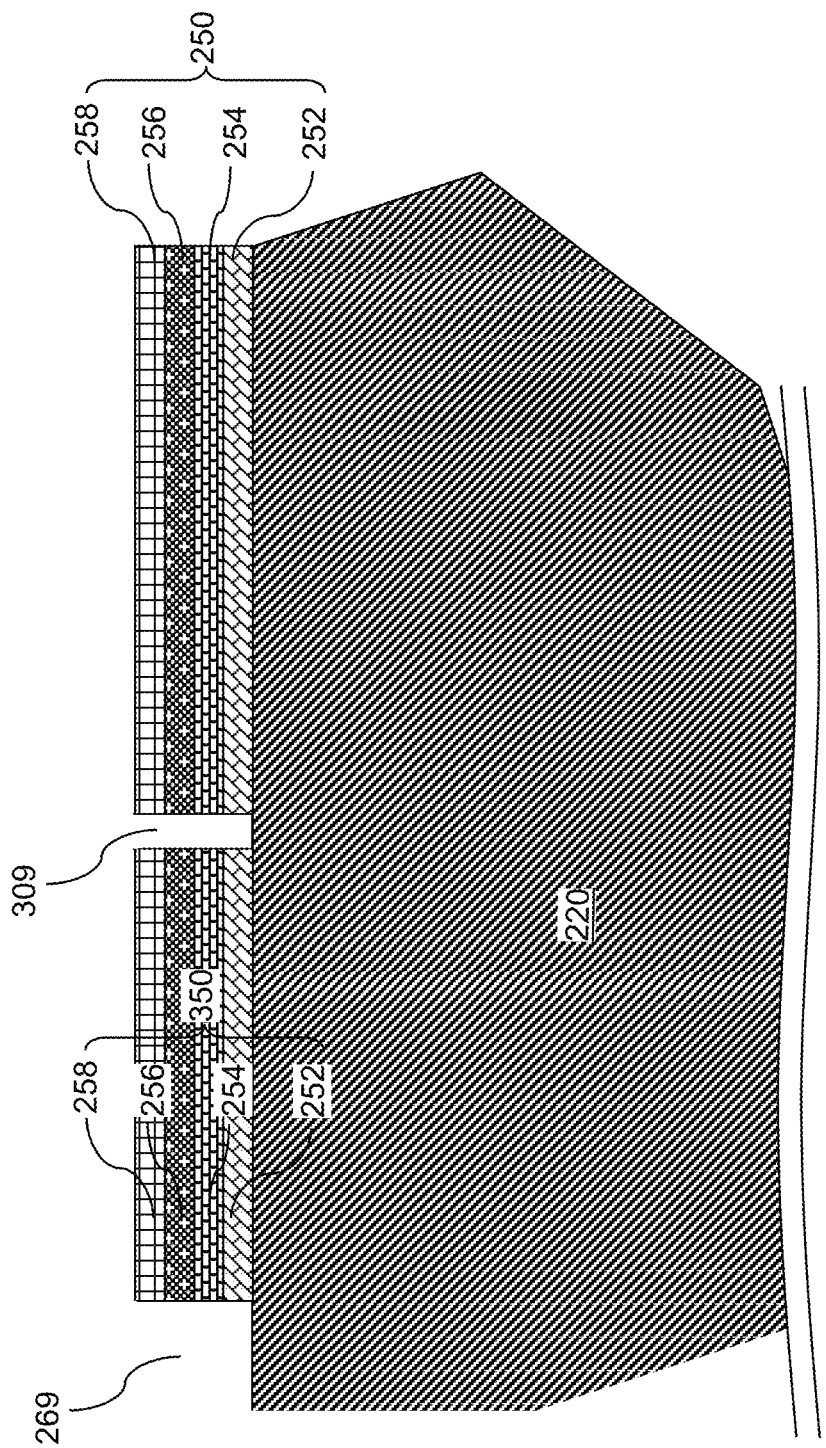

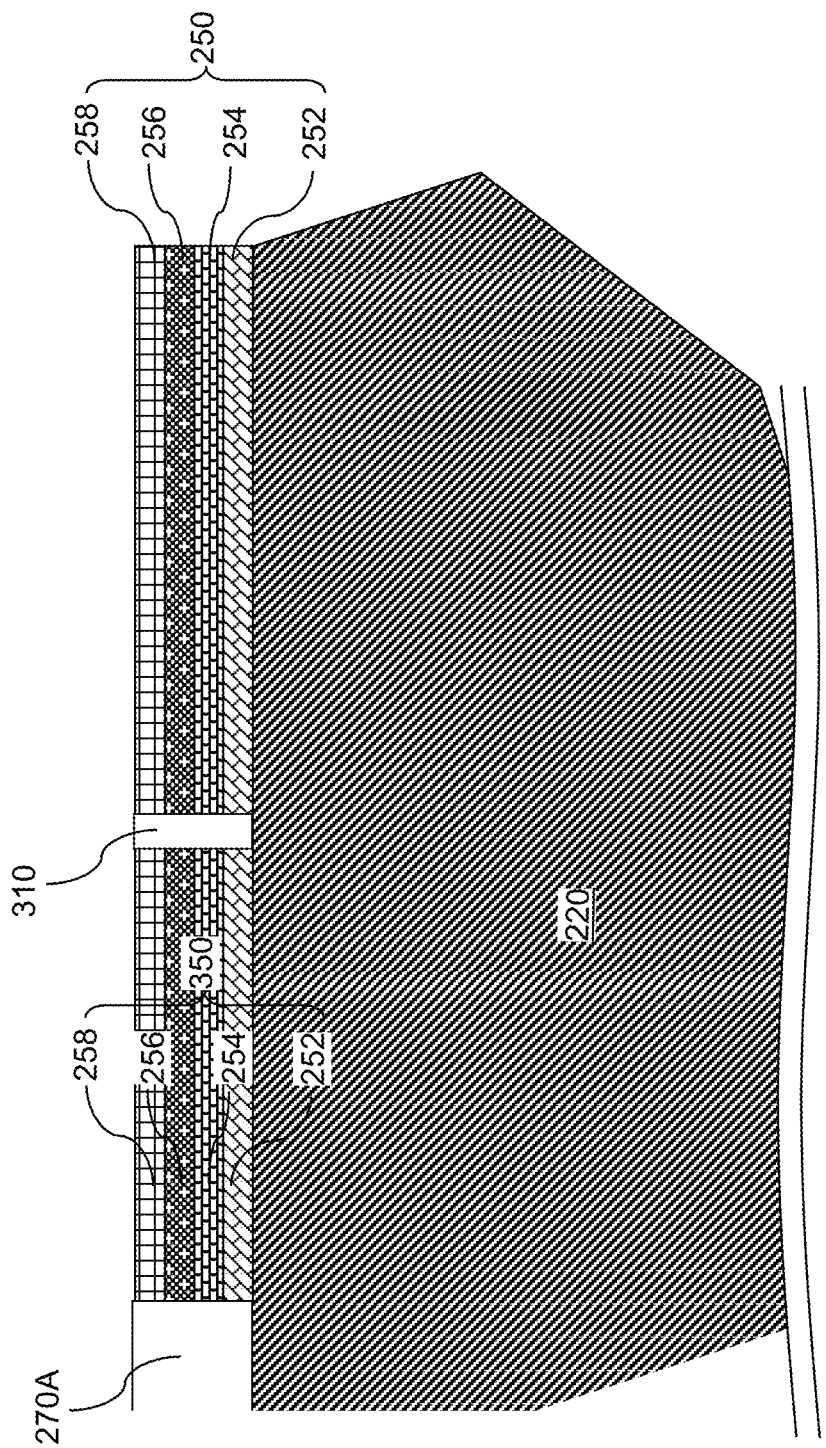

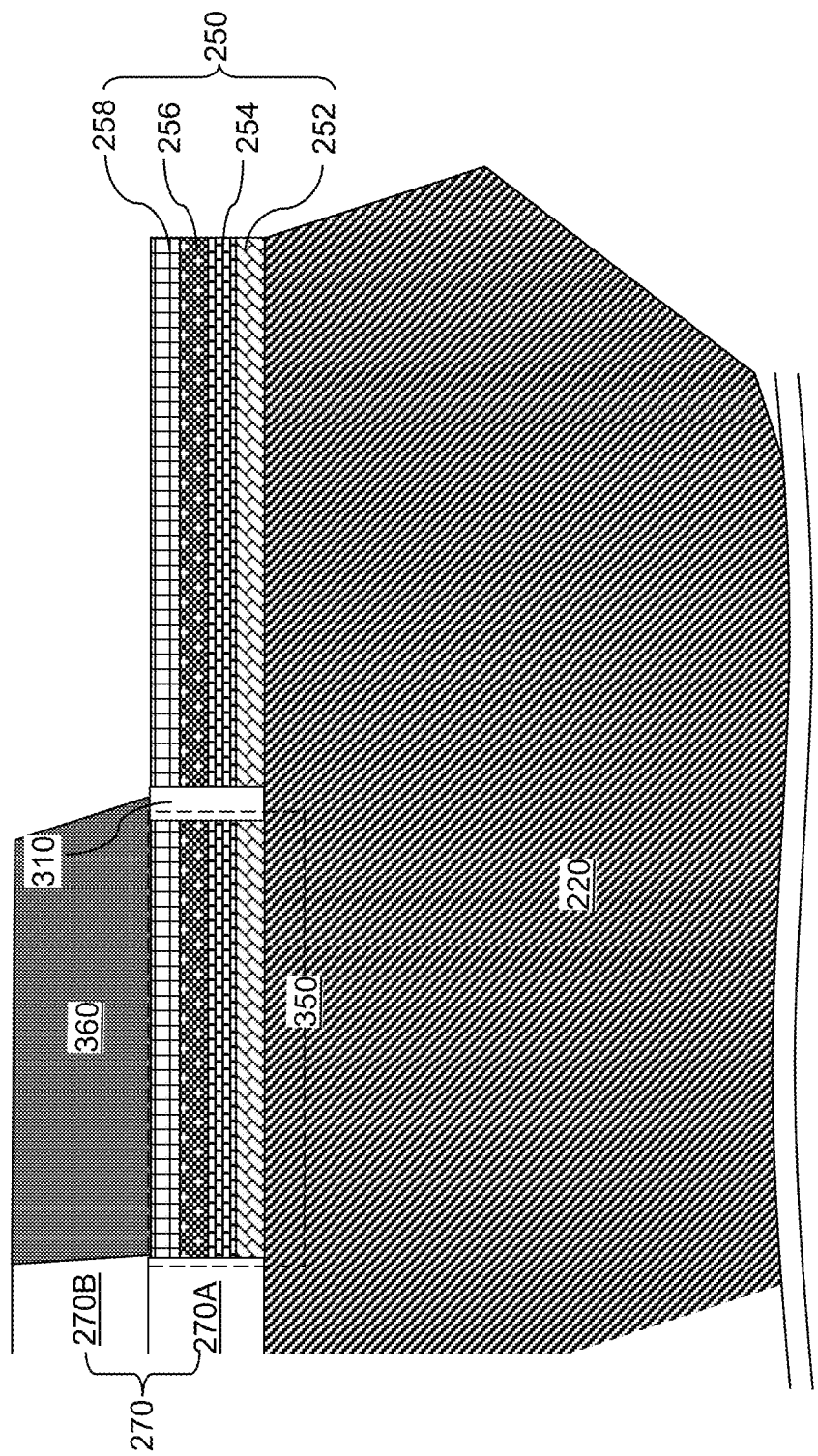

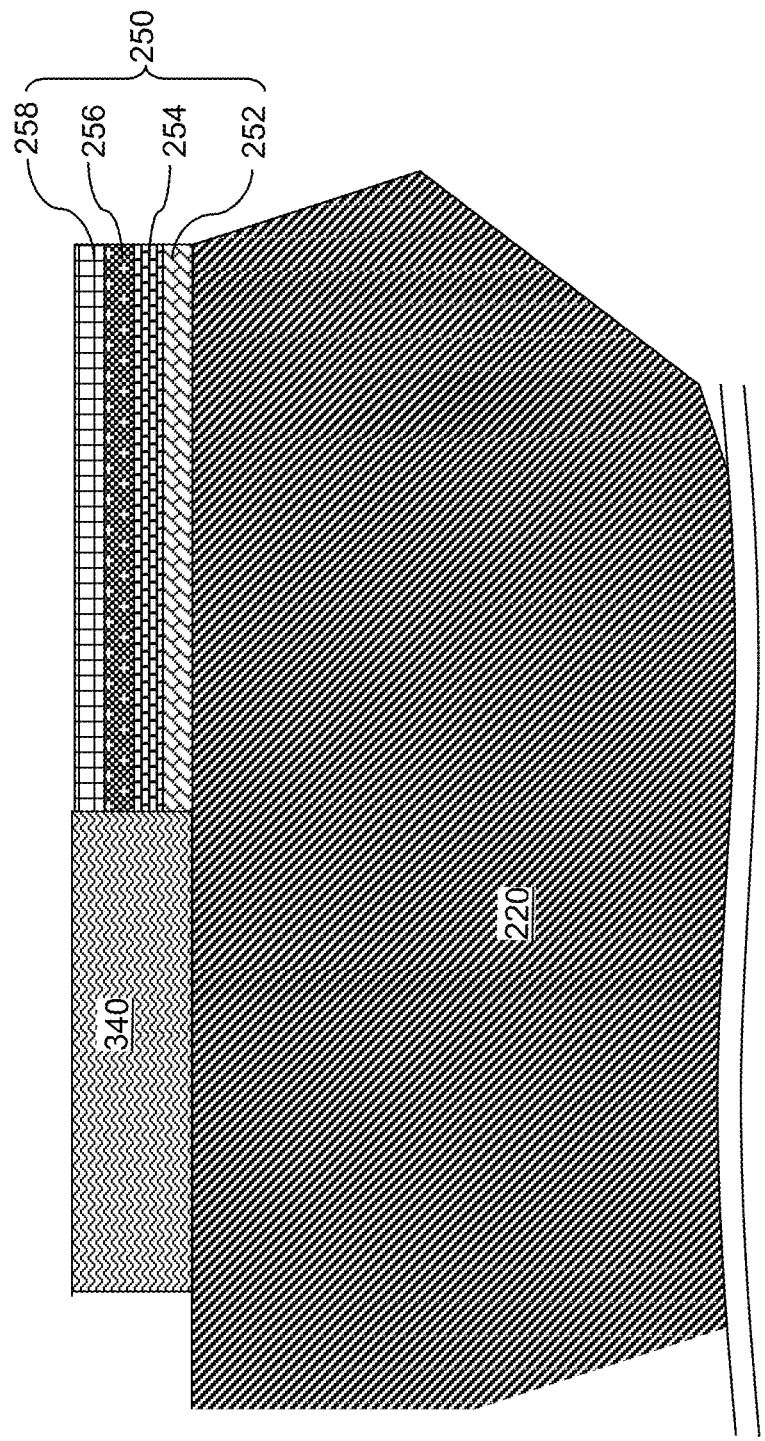

MAGNETIC HEAD WITH ASSISTED MAGNETIC RECORDING

CROSS-REFERENCE TO RELATED APPLICATIONS

This application is a continuation of U.S. patent application Ser. No. 16/252,419, filed Jan. 18, 2019, which application claims benefit of U.S. Provisional Patent Application Ser. No. 62/743,110, filed Oct. 9, 2018, each of which is herein incorporated by reference.

FIELD

The present disclosure relates generally to the field of magnetic recording heads, and particular to assisted magnetic recording.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk 902 comprising a number of servo tracks 904 defined by servo sectors $906_0$-$906_N$ recorded around the circumference of each servo track. Each servo sector $906_i$ comprises a preamble 908 for storing a periodic pattern, which allows proper gain adjustment and timing synchronization of the read signal, and a sync mark 910 for storing a special pattern used to symbol synchronize to a servo data field 912. The servo data field 912 stores coarse head positioning information, such as a servo track address, used to position the head over a target data track during a seek operation. Each servo sector $906_i$ further comprises groups of servo bursts 914 (e.g., N and Q servo bursts), which are recorded with a predetermined phase relative to one another and relative to the servo track centerlines. The phase based servo bursts 914 provide fine head position information used for centerline tracking while accessing a data track during write/read operations. A position error signal (PES) is generated by reading the servo bursts 914, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

FIG. 2A illustrates a conventional disk drive 810 used for data storage. A disk media (i.e., a magnetic disk) 850 is attached to a spindle motor and hub 820. The spindle motor and hub 820 rotate the media 850 in a direction shown by arrow 855. A head stack assembly (HSA) 815 includes a carriage 820 and a voice coil motor (VCM) 825. A first end of an actuator arm 870 is supported by the carriage 820. A second end of the actuator arm 870 supports a head-gimbal assembly (HGA) 830. The HSA 815 positions the actuator arm 870 using the voice coil motor (VCM) 825 and a pivot shaft and bearing assembly 860 over a desired data track 840 of the disk media 850 to read and/or write data from and/or to the data track 840.

FIG. 2B illustrates the details of the HGA 830 located over the data track 840. The HGA 830 includes a slider 880 located above the data track 840 and a magnetic head 600 (also called a recording head or a reading and recording head) located on the slider 880. The magnetic head 600 contains a recording head (also called a magnetic recording transducer, a writing head or a writer) 660. The magnetic head 600 may also contain a reading head (also called a magnetic reading transducer, a reading element or a reader) 610. The media 850 and the track 840 move under the slider 880 in a down-track direction shown by arrow 842. The cross-track direction is shown by arrow 841. The recording head 660 has a leading edge 891 and a trailing edge 892. In this embodiment, the trailing edge 892 of the recording head 660 is the final portion of the recording head 660 that writes (i.e., records) data onto the data track 840 as the media 850 moves under the slider 880 in the down-track direction 842.

FIG. 3 illustrates a side view of the disk drive 810 shown in FIG. 2A. At least one disk media 850 (e.g., plural disk media 850) are mounted onto the spindle motor and hub 820. The HSA 815 supports at least one actuator arm 870 (e.g., plural arms 870). Each actuator arm 870 carries a suspension 875 and the slider 880. The slider 880 has an air bearing surface (ABS) facing the media 850. When the media 850 is rotating and the actuator arm 870 is positioned over the media 850, the slider 880 slides above the media 850 by aerodynamic pressure created between the slider ABS and the surface of media 850.

Data is typically written to the disk by modulating a write current in an inductive coil to record magnetic transitions onto the disk surface in a process referred to as saturation recording. During readback, the magnetic transitions are sensed by a read head and the resulting read signal demodulated by a suitable read channel. However, as conventional perpendicular magnetic recording (PMR) approaches its limit, further growth of the areal recording density becomes increasingly challenging.

SUMMARY

According to an aspect of the present disclosure, a magnetic head includes a main pole configured to serve as a first electrode, an upper pole containing a trailing magnetic shield configured to a serve as a second electrode, and an electrically conductive portion located in a trailing gap between the main pole and the trailing magnetic shield. The electrically conductive portion is not part of a spin torque oscillator stack, and the electrically conductive portion comprises at least one electrically conductive, non-magnetic material layer. The main pole and the trailing magnetic shield are electrically shorted by the electrically conductive portion across the trailing gap between the main pole and the trailing magnetic shield such that an electrically conductive path is present between the main pole and the trailing magnetic shield through the electrically conductive portion.

According to another aspect of the present disclosure, a method of operating a magnetic recording head comprises providing a current between a main pole and an upper pole containing a trailing magnetic shield through an electrically conductive portion located in a trailing gap between the main pole and the trailing shield while applying a magnetic field to the main pole from a coil to record data to a magnetic disk. The electrically conductive portion is not part of a spin torque oscillator stack, and the electrically conductive portion comprises at least one electrically conductive, non-magnetic material layer.

According to yet another aspect of the present disclosure, a method of forming a magnetic head comprises forming a main pole over a substrate, forming an electrically conductive, non-magnetic material layer over the main pole, forming a trailing magnetic shield directly on a trailing sidewall of the electrically conductive, non-magnetic material layer, and forming an air bearing surface (ABS) of the magnetic head by lapping portions of the main pole and the trailing magnetic shield. An electrically conductive path is present between the main pole and the trailing magnetic shield through the electrically conductive, non-magnetic material layer.

BRIEF DESCRIPTION OF THE DRAWINGS

FIG. 2A illustrates a top view of a conventional hard disk drive and FIG. 2B schematically illustrates a top view of a head-gimbal assembly of the hard disk drive of FIG. 2A.

FIG. 5A is an in-track vertical cross-sectional view of a first exemplary recording head according to a first embodiment of the present disclosure.

FIGS. 8A-8F are sequential vertical cross-sectional views of a first exemplary structure for manufacture of the first exemplary recording head according to the first embodiment of the present disclosure.

FIGS. 9A-9E are sequential vertical cross-sectional views of a second exemplary structure for manufacture of the second exemplary recording head according to the second embodiment of the present disclosure.

DETAILED DESCRIPTION

Figure 1:
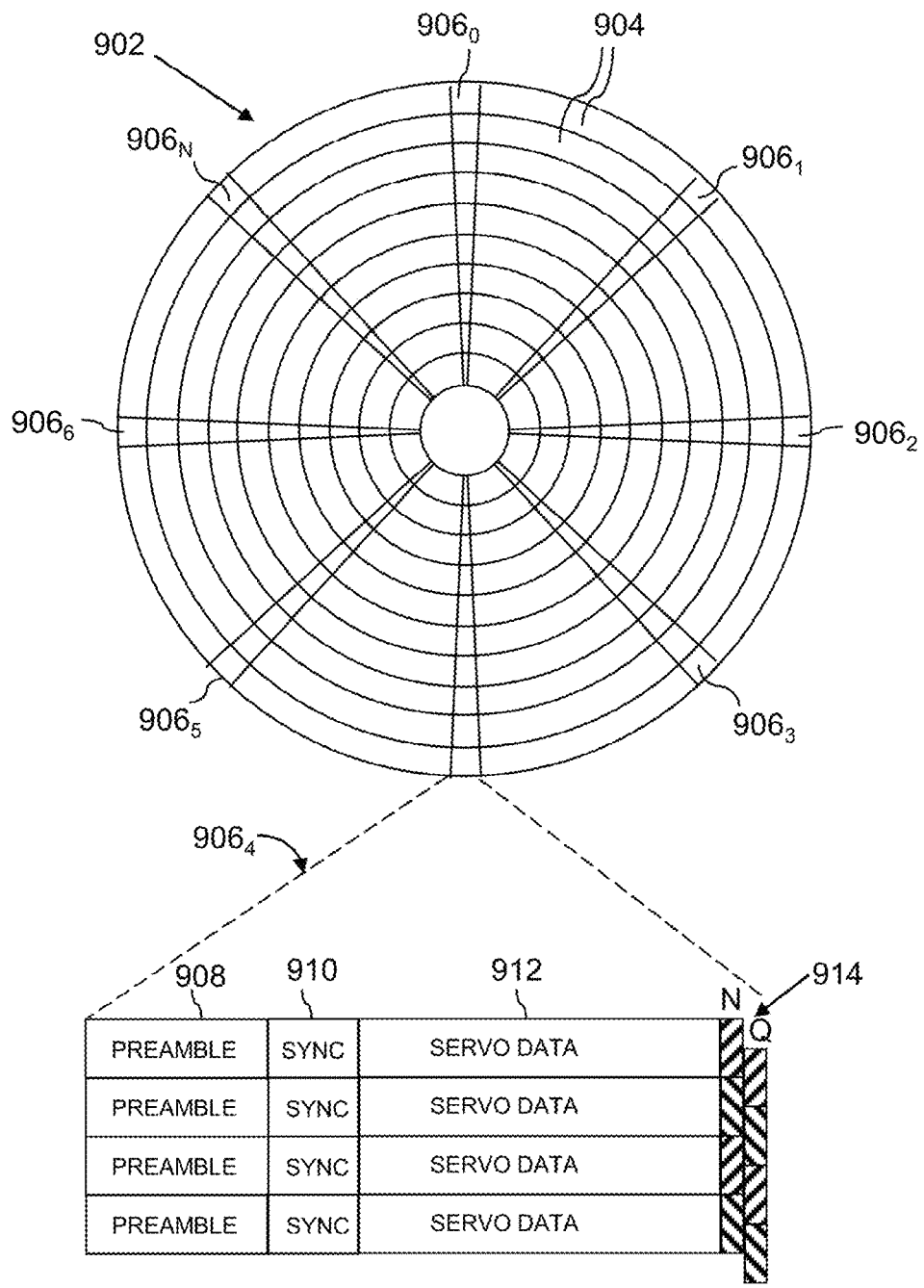
FIG. 1 shows a top view of prior art disk including a plurality of servo tracks defined by servo sectors.

As discussed above, the present disclosure is directed to magnetic recording heads employing Ampere field enhancement and methods of manufacturing such magnetic recording heads.

The drawings are not drawn to scale. Multiple instances of an element may be duplicated where a single instance of the element is illustrated, unless absence of duplication of elements is expressly described or clearly indicated otherwise. Ordinals such as "first," "second," and "third" are employed merely to identify similar elements, and different ordinals may be employed across the specification and the claims of the instant disclosure. The same reference numerals refer to the same element or similar element. Unless otherwise indicated, elements having the same reference numerals are presumed to have the same composition. As used herein, a first element located "on" a second element can be located on the exterior side of a surface of the second element or on the interior side of the second element. As used herein, a first element is located "directly on" a second element if there exist a physical contact between a surface of the first element and a surface of the second element.

As used herein, a "layer" refers to a material portion including a region having a thickness. A layer may extend over the entirety of an underlying or overlying structure, or may have an extent less than the extent of an underlying or overlying structure. Further, a layer may be a region of a homogeneous or inhomogeneous continuous structure that has a thickness less than the thickness of the continuous structure. For example, a layer may be located between any pair of horizontal planes between, or at, a top surface and a bottom surface of the continuous structure. A layer may extend horizontally, vertically, and/or along a tapered surface. A substrate may be a layer, may include one or more layers therein, or may have one or more layer thereupon, thereabove, and/or therebelow.

As used herein, an "electrically conductive material" refers to a material having electrical conductivity greater than $1.0 \times 10^5$ S/cm. As used herein, a "metallic material" refers to a conductive material including at least one metallic element therein. As used herein, an "electrically insulating material" or a "dielectric material" refers to a material having electrical conductivity less than $1.0 \times 10^{-6}$ S/cm. As used herein, a "semiconducting material" refers to a material having electrical conductivity in the range from $1.0 \times 10^{-6}$ S/cm to $1.0 \times 10^5$ S/cm. All measurements for electrical conductivities are made at the standard condition.

Figure 4:
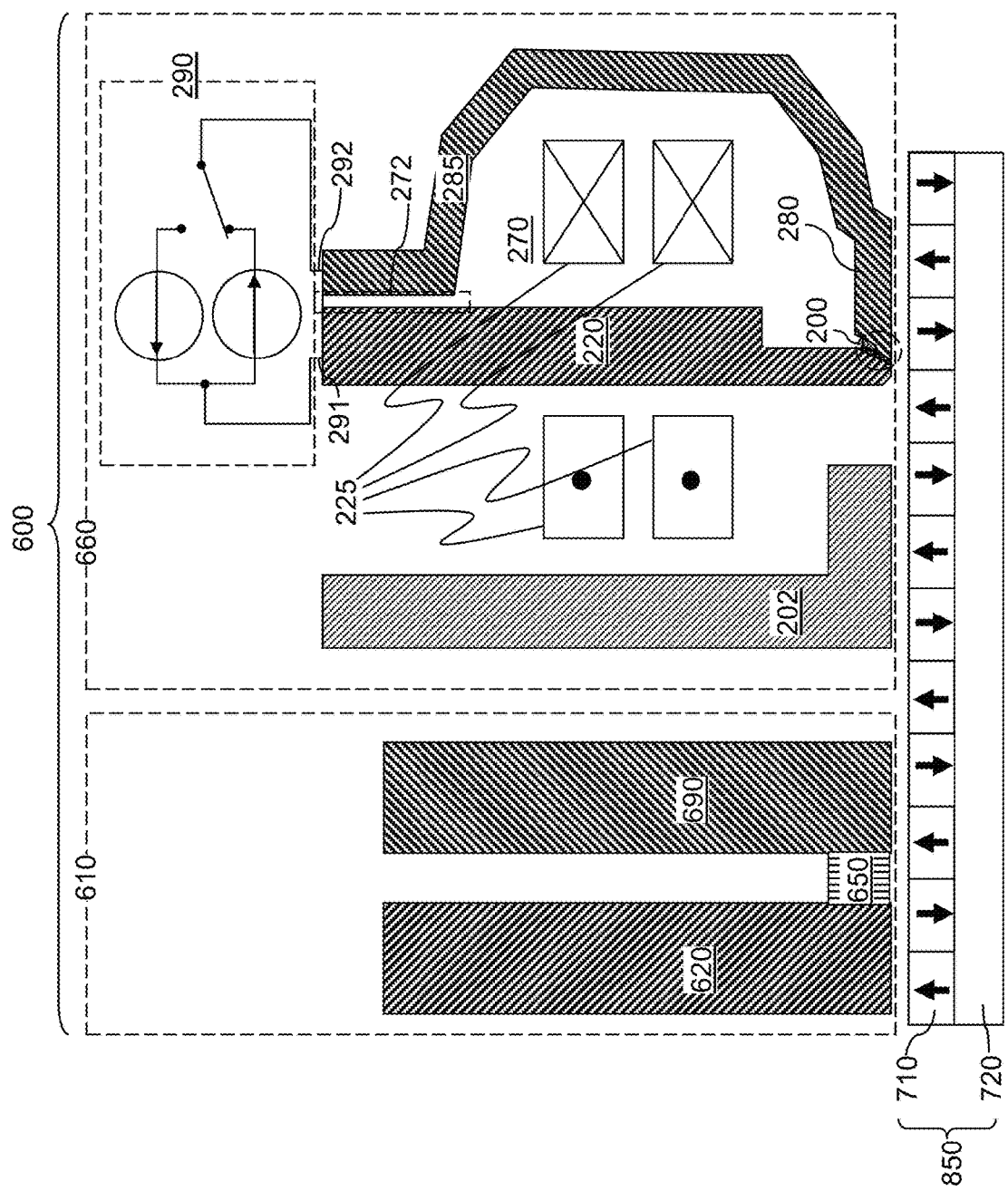
FIG. 4 is an in-track vertical cross-sectional view of an exemplary magnetic head of the present disclosure.

Referring to FIG. 4, an in-track vertical cross-sectional view of an exemplary magnetic head 600 of one embodiment of the present disclosure is illustrated. The magnetic head 600 is configured for magnetic recording employing a spin torque oscillator (STO). The magnetic head 600 is positioned over a recording track 840 on a disk media. The magnetic head 600 comprises, from the leading side of the head (i.e., the left side of FIG. 4), a reading head 610 and a recording head 660. The reading head comprises a lower reading shield 620, a read sensor 650 (i.e., a reading element), and an upper reading shield 690. The read sensor 650 can include a tunnel magnetoresistance (TMR) device, a giant magnetoresistance (GMR) device, or the like.

The recording head 660 can comprise a record element 200 that includes a spin torque oscillator (STO) element, an optional auxiliary pole 202, a main pole 220, a magnetic coil 225 that is wound around the main pole 220, and a trailing shield 280 which may be integrated with an upper pole 285. The record element 200 is formed in a gap between the main pole 220 and the trailing shield 280. The main pole 220 and trailing shield 280 serve as first and second electrodes for flowing electrical current through the record element 200 during recording (i.e., writing). A bias circuitry 290 can be electrically connected to the main pole 220 and the upper pole 285, such as to the end portions of the main pole and the upper pole 285 distal from the ABS and the record element 200. The bias circuitry 290 may include a voltage or current source (or a connection to an external voltage or current source) and one or more switching devices, such as transistors or relays which can switch the voltage or current on and off. The bias circuitry 290 is configured to provide a current or voltage to the main pole 220 and the upper pole 285. For example, the bias circuitry 290 may provide a current between the main pole 220 and the upper pole 285/trailing shield 280 that flows through the record element 200. An insulating material portion 270 is provided around the magnetic coil 225 between the main pole 220, the trailing shield 280 and the upper pole 285. An electrically insulating material layer 272 can be provided between end portions of the main pole 220 and the upper pole 285 where the bias circuitry connections (i.e., electrical contacts 291, 292 attached to the ends of the main pole and upper pole respectively) are made (i.e., distal from the ABS).

During operation of the recording head 660, if perpendicular magnetic recording is employed, a magnetic field emitted from the main pole 220 passes through a magnetic recording layer (e.g., hard magnetic layer) 710 and a soft magnetic underlayer 720 of the recording track 840 of the disk media 850, and returns to the auxiliary pole 202. A magnetization pattern (represented by arrows) is recorded in the magnetic recording layer 710. In an implementation of a MAMR system, the magnetization pattern is recorded when electrical current flows between the main pole 210 and the upper pole 285 which is physically and electrically connected to trailing shield 280, and, in one embodiment, a high-frequency magnetic field from the STO element of the record element 200 is applied to the recording track 840 to temporarily reduce the coercivity of the magnetic recording layer 710.

Figure 5B:
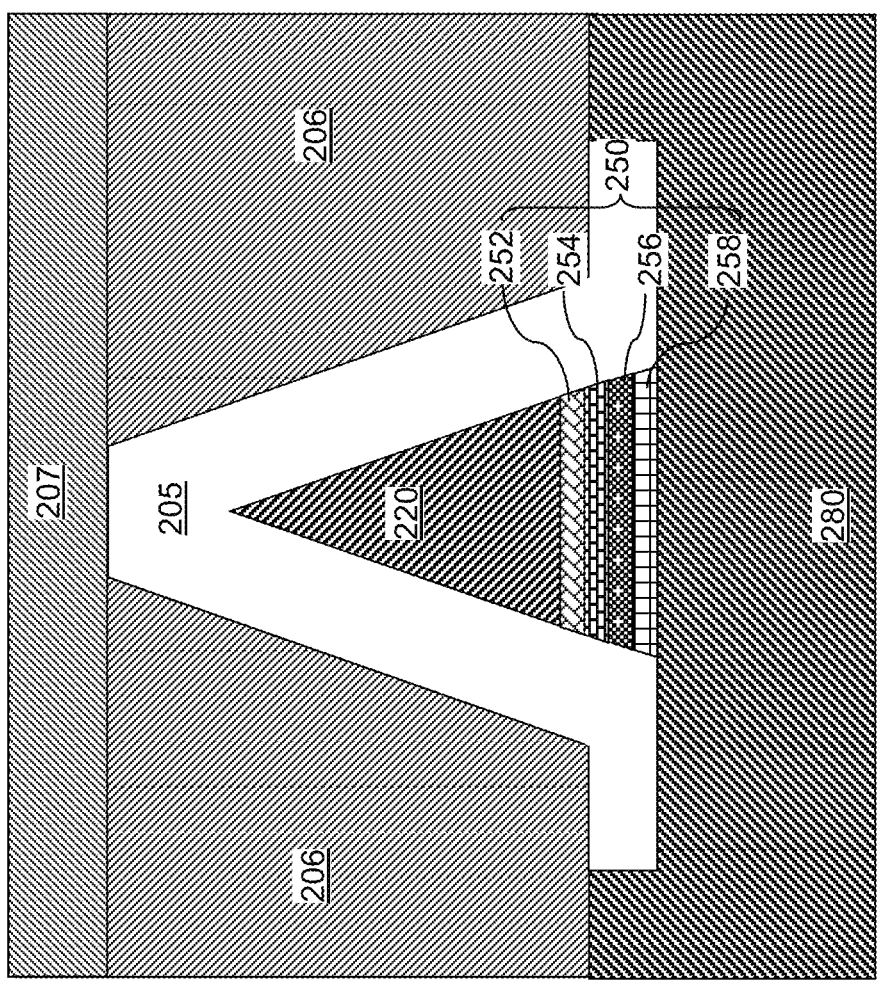
FIG. 5B is an air bearing surface (ABS) view of a portion of the first exemplary recording head according to the first embodiment of the present disclosure.

FIGS. 5A and 5B show magnified views of a first exemplary embodiment of the recording head 660 of a system that includes a record element 200 according to a first embodiment of the present disclosure. The main pole 220 is configured to emit a recording magnetic field for affecting the magnetic medium of the magnetic recording layer 710 (shown in FIG. 4). When electrical current passes through the magnetic coil 225, the magnetic field generated by the electrical current through the magnetic coil 225 magnetizes the soft magnetic material of the main pole 220, and the magnetic field is guided by through the main pole 220 and the trailing shield 280 to complete a magnetic loop.

As shown in FIG. 5B, the record element 200 includes a spin torque oscillator (STO) stack 250 located on a trailing sidewall of the main pole 220 in a gap between the main pole and the trailing shield. Side magnetic shields (also known as wrap around shield, WAS) 206 can be provided around the main pole 220 without physically contacting the main pole 220. A gap 205 which can be filled with a non-magnetic material, such as a dielectric material, for example aluminum oxide, is provided between the main pole 220 and each of the seed layer 207 and the side magnetic shields 206. The side magnetic shields 206 can be provided on the sides of the main pole 220, and may contact an electrically conductive seed layer 207 and the trailing shield 280. The trailing shield 280 is a magnetic shield located on a trailing sidewall of the spin torque 250 stack.

The main pole 220 is configured to serve as a first electrode of an electrical circuit, and the trailing shield 280 is configured to serve as a second electrode of the electrical circuit. The electrical circuit is biased by the bias circuitry 290, which is configured to provide electrical current between the main pole 220 and the trailing shield 280/upper pole 285 through the record element 200 in two opposite directions, which correspond to the two opposite magnetization directions that the record element 200 can induce in the magnetic medium to be recorded. An air bearing surface (ABS) of the magnetic head 600 includes planar surfaces of the main pole 220, the spin torque oscillator 250, and the magnetic shield as embodied as the trailing shield 280. Thus, the spin torque oscillator is exposed to the ABS. The planar surfaces can be within a same two-dimensional plane that provided by lapping during a manufacturing process.

As shown in the inset in FIG. 5A, according to an aspect of the present disclosure, a first electrically conductive path ECP1 is present through the spin torque oscillator 250 stack between the first electrode (as embodied as the main pole 220) and the second electrode (as embodied as the trailing shield 280). A second electrically conductive path ECP2 in a parallel connection with the first electrically conductive path ECP1 is present between the first electrode and the second electrode through a conductive material portion 360. Preferably but not necessarily, the conductive material portion 360 includes an electrically conductive, non-magnetic metal or a non-magnetic metallic alloy. In one embodiment, the conductive material portion 360 does not include a material that generates an alternating magnetic field upon application of an electrical current therethrough.

In one embodiment, the conductive material portion 360 is located in the gap between the main pole 220 and the trailing shield 280. In one embodiment, the conductive material portion 360 is not exposed to the ABS and is spaced from the ABS by a portion of the trailing shield 280 and or by the STO 250. In one embodiment, the conductive material portion 360 contacts a leading surface of the trailing shield 280. In one embodiment, the conductive material portion 360 includes a non-magnetic electrically conductive material, which can be a non-magnetic metal such as copper, tungsten, ruthenium, chromium and/or any other non-magnetic metal or a non-magnetic metallic alloy.

In one embodiment, a conductive layer stack 350 can also be provided in the gap between the main pole 220 and the trailing shield 280 within the second electrically conductive path ECP2. The conductive layer stack 350 can have a same set of component layers as the spin torque oscillator 250 stack, and can be spaced from the spin torque oscillator 250 stack by a dielectric spacer 310. The dielectric spacer 310 includes a dielectric material such as aluminum oxide, silicon oxide, and/or silicon nitride, and prevents the conductive layer stack 350 from functioning as another spin torque oscillator stack. In one embodiment, the conductive material portion 360 causes a predominant portion of the magnetic flux through the main pole 220 to flow through the spin torque oscillator 250 stack, and significantly reduces the magnetic flux through the conductive layer stack 350. For this reason, spin torque effect in the conductive layer stack 350 is much less than the spin torque effect in the spin torque oscillator 250 stack.

In one embodiment, the conductive layer stack 350 and the spin torque oscillator 250 stack can be located directly on the trailing sidewall of the main pole 220 in the trailing gap 222 between the main pole and the trailing shield 280. The conductive material portion 360 can be located on a trailing sidewall of the conductive layer stack 350. In one embodiment, an interface between the spin torque oscillator 250 stack and the magnetic shield (as embodied as the trailing shield 280) can be within a same plane as an interface between the conductive layer stack 350 and the conductive material portion 360.

Referring to the inset in FIG. 5A, the main pole 220 can have a trailing edge taper such that the trailing edge of the main pole and the trailing gap 222 between the main pole 220 and the trailing shield 280 can be tapered (i.e., slanted) in a non-perpendicular direction compared to the ABS. For example, the trailing edge of the main pole 220 and the trailing gap 222 can extend in a direction which is inclined with respect to the plane of the ABS by an angle of 10 to 80 degrees, such as 30 to 60 degrees. The trailing shield 280 can have a "bump" structure at a throat portion which results in the narrowing of the trailing gap 222 adjacent to the ABS where the STO 250 is located. The bump structure which defines a short effective trailing shield throat height (eTH) that may range from 20 nm to 150 nm. The shortest dimension in the direction into the air bearing surface (ABS) that determines the current path can be defined by either the eTH (if the bump material is non-conducting), or back edge position of the conducting trailing gap (if it is patterned and shorter than eTH), or both (if the two coincide).

Above the STO 250 and above the bump in the trailing shield 280, the trailing gap 222 is wider (i.e., has a larger width) than the width of the trailing gap 222 adjacent to the bump (i.e., the throat portion) of the trailing shield 280. The conductive layer stack 350 and the conductive material portion 360 are located in the wider portions of the trailing gap 222 above the throat portion of the trailing shield 280 while the STO 250 stack is located adjacent to the throat portion of the trailing shield in the narrower portion of the trailing gap 222. Thus, the conductive layer stack 350 and the conductive material portion 360 electrically short the main pole 220 and the trailing shield 280 across the trailing gap 222.

The electrical bias circuitry 290 is configured to flow electrical current between the first electrode (embodied as the main pole 220) and the second electrode (embodied as the trailing shield 280) through the first electrically conductive path ECP1 and the second electrically conductive path ECP2 in a forward direction and in a reverse direction depending on selection of a bias direction by the switching elements of the electrical bias circuitry 290.

In one embodiment, the spin torque oscillator 250 stack is configured to generate a high-frequency magnetic field which is superimposed with the recording magnetic field to record data to the magnetic medium when current flows through the first and second electrically conductive paths (ECP1, ECP2). The spin torque oscillator 250 stack can include any material layer stack that is effective for the purpose of generating the high-frequency magnetic field for superposition with the recording magnetic field. The combination of the high-frequency magnetic field with the recording magnetic field lowers the coercivity of the magnetic medium on a disk during the recording process.

In an illustrative example shown in FIG. 5B, the spin torque oscillator 250 stack can include a stack, from the side of the leading edge to the side of the trailing edge, an electrically conductive, non-magnetic seed layer 252, a spin polarized layer 256 that generates precession of magnetization during operation, a non-magnetic electrically conductive spacer layer 256, and an optional magnetic field generating layer 258. In an illustrative example, the non-magnetic conductive seed layer 252 can include a non-magnetic conductive material such as Cr, Ru, W, and Cu, the spin polarized layer can include a magnetic nickel-iron alloy, the non-magnetic conductive spacer layer 256 can include a non-magnetic conductive material such as Cu, and the optional field generating layer 258, if present, can include another magnetic nickel-iron alloy. If the field generating layer 258 is present, then another optional non-magnetic, electrically conductive spacer layer (e.g., copper spacer layer) may be located between layer 258 and the trailing shield 280.

The thickness of the non-magnetic conductive seed layer 252 can be in a range from 3 nm to 12 nm, although lesser and greater thicknesses can also be employed. The thickness of the spin polarized layer 256 can be in a range from 3 nm to 12 nm, although lesser and greater thicknesses can also be employed. The frequency of the magnetic field generated by the spin polarized layer 256 can be in a range from 10 GHz to 40 GHz, although lesser and greater frequencies can be employed. The magnitude of the magnetic field generated by the spin polarized layer 256 can be in a range from 250 Gauss to 1,000 Gauss, although lesser and greater magnitudes can be employed for the magnetic field. The thickness of the non-magnetic conductive spacer layer 256 may be in a range from 3 nm to 15 nm, although lesser and greater thicknesses can also be employed. The thickness of the field generating layer 258, if present, may be in a range from 3 nm to 12 nm, although lesser and greater thicknesses can also be employed. Additional layers may be optionally employed to enhance performance of the spin torque oscillator 250 stack.

Figure 6:
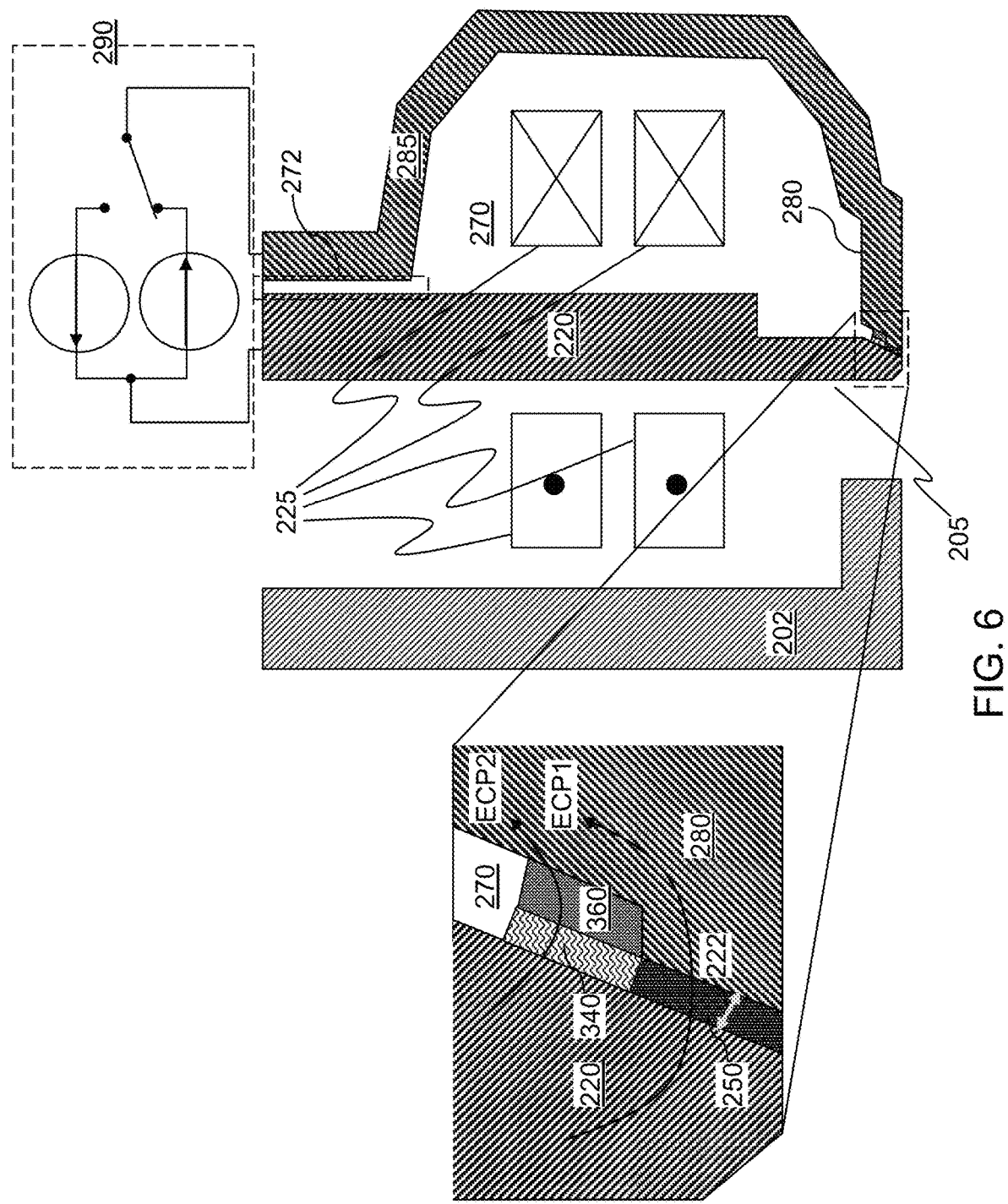
FIG. 6 is an in-track vertical cross-sectional view of a second exemplary recording head according to a second embodiment of the present disclosure.

FIG. 6 shows magnified views of a second exemplary embodiment of a recording head 660 that includes a record element 200 according to a second embodiment of the present disclosure. The recording head 660 illustrated in FIG. 6 can be derived from the recording head 660 illustrated in FIGS. 5A and 5B by modifying the record element 200.

The recording head 660 of the second exemplary embodiment is the same as the recording head 660 of the first exemplary embodiment, except that the conductive layer stack 350 is replaced by a first conductive material portion 340, and the dielectric spacer 310 may be omitted. All other components of the recording head 660 of the second exemplary embodiment are the same as those of the recording head 660 of the first exemplary embodiment and will not be repeated herein for brevity.

The first conductive material portion 340 is provided within the second electrically conductive path ECP2. The first conductive material portion 340 is not exposed to the ABS and is spaced from the ABS by the spin torque oscillator 250 stack and/or the throat portion of the trailing shield 280. Preferably but not necessarily, the first conductive material portion 340 includes an electrically conductive non-magnetic metal (e.g., copper) or a non-magnetic metallic alloy. Alternatively, the first conductive material portion 340 can include a conductive multilayer stack of non-magnetic layers. In one embodiment, the first conductive material portion 340 does not include a material that generates an alternating magnetic field upon application of an electrical current therethrough.

In one embodiment, the first conductive material portion 340 contacts the trailing sidewall of the main pole 220 and a rear sidewall of the spin torque oscillator 250 stack that is located on an opposite side of the STO 250 stack from the ABS. The second conductive material portion 360 can be located on a trailing sidewall of the first conductive material portion 340 and contact the trailing shield 280. Thus, the first and the second conductive material portions 340, 360 electrically short the main pole 220 to the trailing shield 280. In one embodiment, an interface between the spin torque oscillator 250 stack and the trailing shield 280 can be within the same plane as an interface between the first conductive material portion 340 and the second conductive material portion 360. In one embodiment, the first conductive material portion 340 and the spin torque oscillator 250 stack can be located directly on the trailing sidewall of the main pole 220. The STO 250 stack is located in the trailing gap 222 adjacent to the throat portion of the trailing shield 280, while the first and the second conductive material portions 340, 360 are not exposed to the ABS and are located in the wider portion of the gap above the throat portion of the trailing shield 280.

The electrical bias circuitry 290 is configured to flow electrical current between the first electrode (embodied as the main pole 220) and the second electrode (embodied as the trailing shield 280/upper pole 285) through the first electrically conductive path ECP1 and the second electrically conductive path ECP2 in a forward direction and in a reverse direction depending on selection of a bias direction. The spin torque oscillator 250 stack can have the same configuration as, and provide the same function as, in the first embodiment.

In an alternative embodiment, first and the second conductive material portions 340, 360 may be replaced by single electrically conductive, non-magnetic layer, such as copper. Thus, a single electrically conductive, non-magnetic layer may be located in the trailing gap 222 in addition to the STO 250.

Figure 7A:
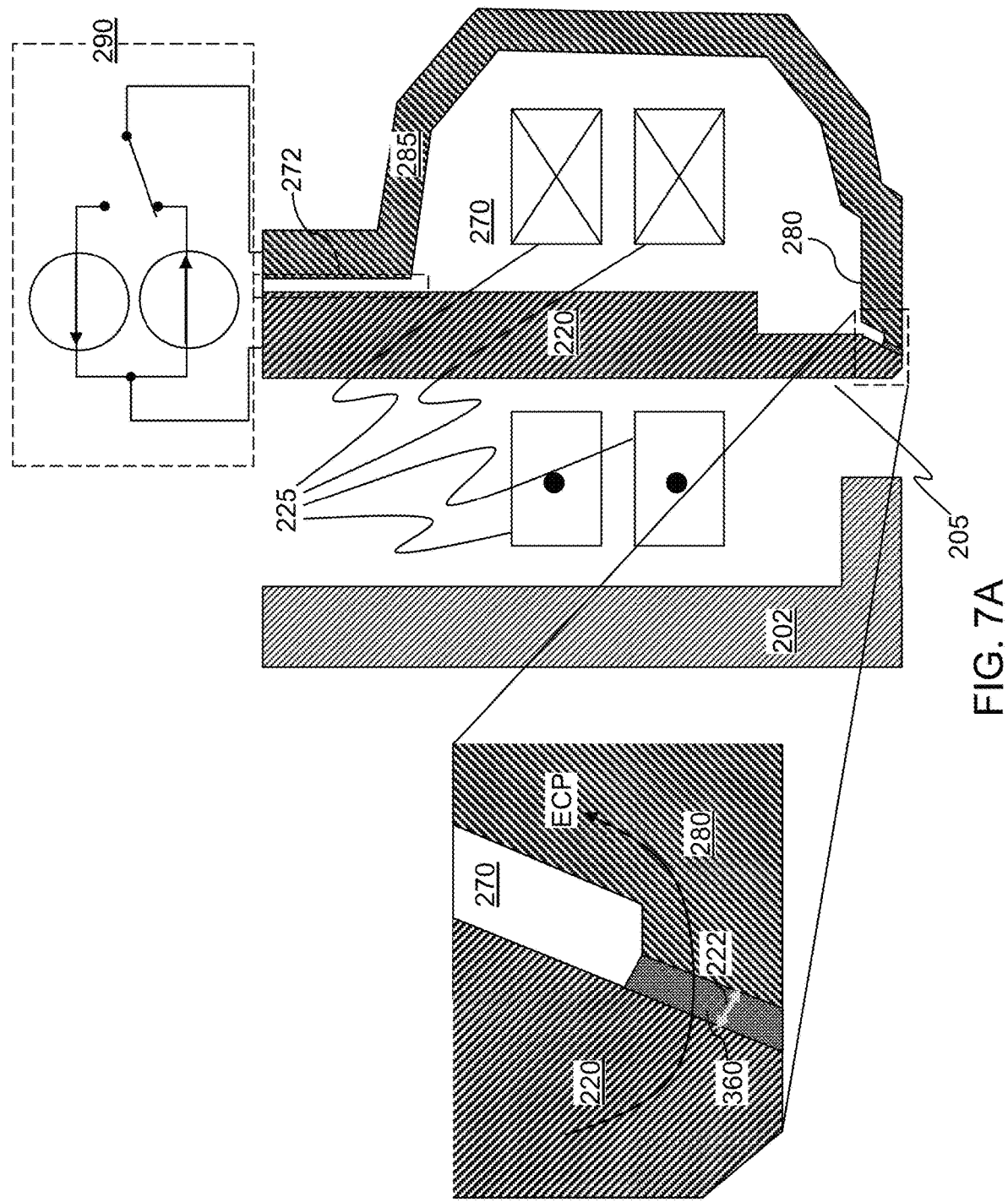
FIG. 7A is an in-track vertical cross-sectional view of a third exemplary recording head according to a third embodiment of the present disclosure.
Figure 7B:
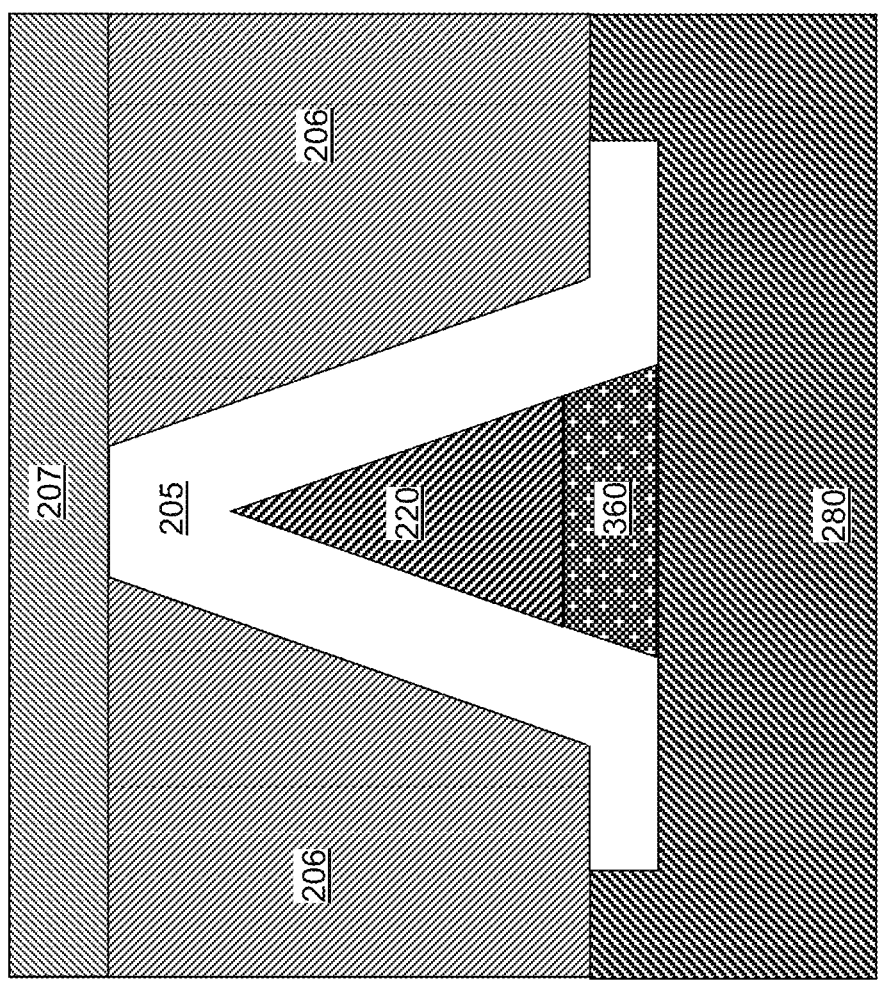
FIG. 7B is an ABS view of a portion of the third exemplary recording head according to the third embodiment of the present disclosure.

FIGS. 7A and 7B show magnified views of a third exemplary embodiment of a recording head 660 that includes a conductive material portion 360 as a read element according to a third embodiment of the present disclosure. The recording head 660 illustrated in FIGS. 7A and 7B can be derived from the recording head 660 illustrated in FIGS. 5A and 5B by modifying the record element 200.

The recording head 660 of the third exemplary embodiment is the same as the recording head 660 of the first exemplary embodiment, except that the STO 250 and the conductive layer stack 350 are replaced by a conductive material portion 360, and the dielectric spacer 310 may be omitted. All other components of the recording head 660 of the second exemplary embodiment are the same as those of the recording head 660 of the first exemplary embodiment and will not be repeated herein for brevity.

Preferably but not necessarily, the conductive material portion 360 includes at least one electrically conductive, non-magnetic material layer, such as at least one metal (e.g., copper, gold, platinum, ruthenium, chromium or tungsten) layer or a non-magnetic metallic alloy layer, such as a single electrically conductive non-magnetic material layer. Alternatively, the conductive material portion 360 can include a conductive multilayer stack of non-magnetic layers, or a multilayer stack of electrically conductive, magnetic and non-magnetic layers. In one embodiment, the conductive material portion 360 does not include a material that generates an alternating magnetic field upon application of an electrical current therethrough.

The record element 200 can consist of only the conductive layer 360, which is located on a trailing sidewall of the main pole 220. Side magnetic shields 206 can be provided around the main pole 220 tip without physically contacting the main pole 220 as illustrated in FIG. 7B. The side magnetic shields 206 can be provided on the sides of the main pole 220, and may contact the seed layer 207 and the trailing shield 280. A gap 205 filled with a dielectric is provided between the main pole 220 and each of the seed layer 207 and the side magnetic shields 206. The trailing shield 280 is a magnetic shield located on a trailing sidewall of the spin torque oscillator 250 stack.

The main pole 220 is configured to serve as a first electrode of an electrical circuit, and the trailing shield 280 is configured to serve as a second electrode of the electrical circuit. The electrical circuit is biased by the bias circuitry 290, which is configured to provide electrical current through the main pole 220 and the trailing shield 280/upper pole 285 in two opposite directions, which correspond to the two opposite magnetization directions that the record element 200 can induce in the magnetic medium to be recorded. An air bearing surface (ABS) of the magnetic head 600 includes planar surfaces of the main pole 220, the conductive material portion (e.g., the non-magnetic conductive layer) 360, and the trailing shield 280. Thus, in this embodiment, the conductive material portion 360 is exposed to the ABS. The planar surfaces can be within a same two-dimensional plane that provided by lapping during a manufacturing process. In one embodiment, the conductive layer 360 located in the trailing gap 222 contacts the trailing sidewall of the main pole 220 and a leading sidewall of trailing shield 280 to electrically short them.

According to an aspect of the present disclosure, an electrically conductive path ECP is present through the conductive layer 360 between the first electrode (as embodied as the main pole 220) and the second electrode (as embodied as the trailing shield 280). The electrical bias circuitry 290 is configured to flow electrical current between the first electrode (embodied as the main pole 220) and the second electrode (embodied as the trailing shield 280) through the electrically conductive path ECP in a forward direction and in a reverse direction depending on selection of a bias direction.

In one embodiment, a distal end of the main pole 220 and a distal end of the trailing magnetic shield 280, can be located on an opposite side of the air bearing surface ABS. The distal end of the main pole 220 which is connected to one electrical contact 291 can be an end portion of the first electrode the electrical bias circuitry 290, and the distal end of the trailing shield 280 which is connected to another electrical contact 292 of the electrical bias circuitry 290 can be an end portion of the second electrode. The electrically conductive path ECP through the conductive layer 360 (i.e., through the record element 200 which consists of only layer 360) can be the only path that provides electrical conduction between the distal end of the main pole 220 and the distal end of the trailing magnetic shield 280 for conduction of electrical current through the main pole. In one embodiment, an electrically insulating material layer 272 can provide physical isolation and electrical isolation between the distal end of the main pole 220 and the distal end of the upper pole 285.

Figure 3:
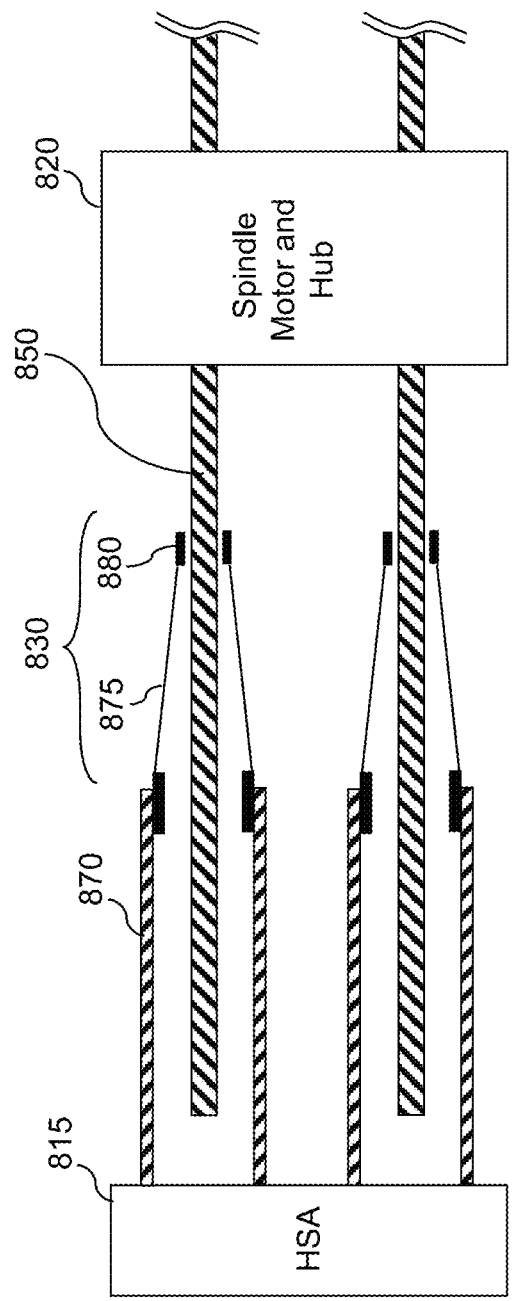
FIG. 3 illustrates a side view of the conventional hard disk drive of FIG. 2A.

The record element 200 of the first, second and/or third embodiments may be incorporated into the magnetic head 600 shown in FIG. 4. A magnetic storage device can be provided, which includes the magnetic head 600 incorporating the features of the first, second or third exemplary recording head 660, the magnetic medium which may be embodied as the magnetic recording layer 710 of the recording track 840 of a disk medium 850, a drive mechanism for passing the magnetic medium over the magnetic head 600, and a controller electrically coupled to the magnetic head 600 for controlling operation of the magnetic head 600 as illustrated in FIGS. 2 and 3.

Figure 8A:
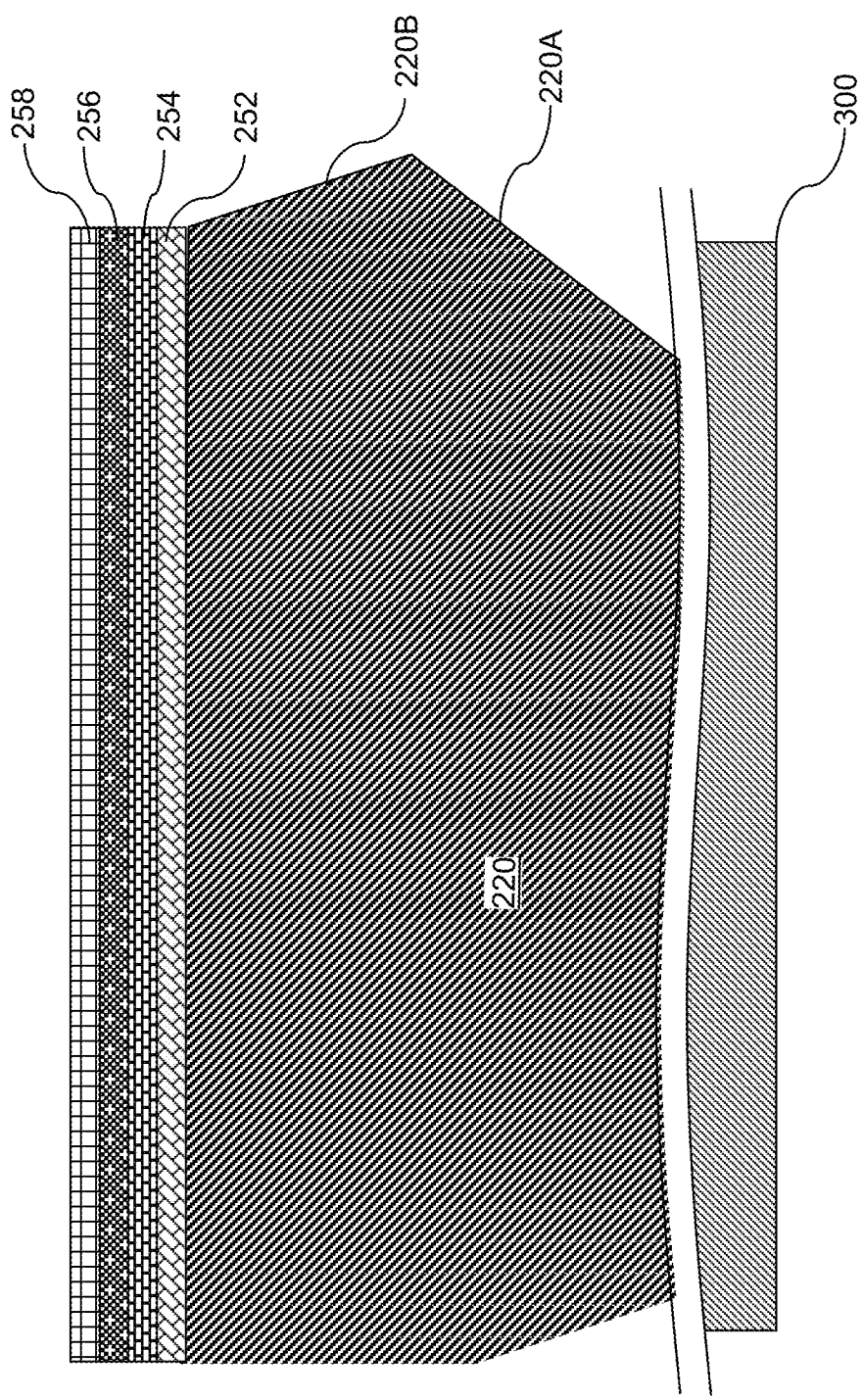

FIGS. 8A-8F illustrate a sequence of processing steps that can be employed to manufacture the first exemplary recording head. Referring to FIG. 8A, an auxiliary pole 202, side magnetic shields 206, and a dielectric material filling a portion of the gap 205 between the main pole 220 and the side magnetic shields 206 (not shown for clarity) are formed over a substrate 300. The main pole 220 is subsequently formed within a groove formed in the dielectric material. In one embodiment, the main pole 220 may have a leading edge tapered surface 220A (which may be supported by the side magnetic shield 206 and/or by a dielectric layer, which is not shown for clarity) and a trailing edge tapered surface 220B. Subsequently, a layer stack of component layers (252, 254, 256, 258) for forming a spin torque oscillator stack can be formed on a top (i.e., trailing) surface of the main pole 220, which is a trailing sidewall of the main pole 220. The layer stack may extend over the trailing edge tapered surface 220B of the main pole (not shown for clarity). Specifically, the non-magnetic conductive seed layer 252, the spin polarized layer 256 that generates precession of magnetization during operation, the non-magnetic conductive spacer layer 256, and the optional field generating layer 258 can be sequentially deposited. The composition and the thickness of the various component layers (252, 254, 256, 258) for the spin torque oscillator 250 stack can be as described above. The various component layers (252, 254, 256, 258) can be formed by conformal and/or non-conformal deposition process such as chemical vapor deposition (CVD), atomic layer deposition (ALD), physical vapor deposition (PVD), and/or various plating methods.

Referring to FIG. 8B, the layer stack of component layers (252, 254, 256, 258) for forming the spin torque oscillator stack can be patterned by a combination of a lithographic patterning process and an etch process. For example, a photoresist layer (not shown) can be applied over the spin torque oscillator 250 stack, and can be lithographically patterned to cover two discrete portions near an edge of the main pole 220 that is proximal to the air bearing surface to be subsequently formed. The gap between the two discrete portions of the patterned photoresist layer can have the dimension of the width of the dielectric spacer 310 to be subsequently formed, and may be in a range from 15 nm to 60 nm, although lesser and greater widths can also be employed. The pattern in the photoresist layer is transferred to through the layer stack of component layers (252, 254, 256, 258) by the etch process. For example, an ion milling process that employs the patterned photoresist layer as an etch mask can be employed to pattern the layer stack of component layers (252, 254, 256, 258).

A continuous remaining portion of the layer stack of component layers (252, 254, 256, 258) located at the air bearing surface side constitutes the spin torque oscillator 250 stack, which is a mesa structure. Another continuous remaining portion of the layer stack of component layers (252, 254, 256, 258) located adjacent to the spin torque oscillator 250 stack constitutes the conductive layer stack 350, which is another mesa structure. A trench 309 is provided between the spin torque oscillator 250 stack and the conductive layer stack 350. A field region 269 is provided, which includes a physically exposed top surface of the main pole 220 and is free of remaining portions of the layer stack of component layers (252, 254, 256, 258). The conductive layer stack 350 has a same set of component layers (252, 254, 256, 258) as the spin torque oscillator 250 stack.

Referring to FIG. 8C, a dielectric material can be deposited in the trench 309 and in the field region 269. Excess portions of the dielectric material can be removed from above the top surfaces of the conductive layer stack 350 and the spin torque oscillator 250 stack by a planarization process such as chemical mechanical planarization (CMP). The remaining portion of the dielectric material in the trench 309 constitutes the dielectric spacer 310. The remaining portion of the dielectric material in the field region 269 constitutes a first dielectric material portion 270A. The dielectric spacer 310 and the first dielectric material portion 270A include a dielectric material such as aluminum oxide, silicon oxide, or silicon nitride. The conductive layer stack 350 is spaced from the spin torque oscillator 250 stack by the dielectric spacer 310.

Referring to FIG. 8D, another dielectric material can be deposited and patterned to form a second dielectric material portion 270B, which can be formed directly on the top surface of the first dielectric material portion 270A. The second dielectric material portion 270B includes a dielectric material such as aluminum oxide, silicon oxide, or silicon nitride. The first and second dielectric material portions (270A, 270B) can be components of the insulating material portion 270. An electrically conductive, non-magnetic material can be deposited over the top surface of the conductive layer stack 350. For example, a lithographic patterning process can be performed to form a patterned photoresist layer including an opening within the area of the conductive layer stack 350. The conductive material can be deposited in the opening in the photoresist layer, and the photoresist layer can be lifted off to form the conductive material portion 360 described above. Alternatively, a non-conductive material layer may be deposited as a continuous layer, and can be patterned by a combination of a lithographic patterning process and an etch (e.g., ion milling) process to provide the conductive material portion 360. In this case, the second dielectric material portion 270B can be formed before or after forming the conductive material portion 360. In one embodiment, the conductive material portion 360 does not physically contact the spin torque oscillator 250 stack.

Preferably but not necessarily, the conductive material portion 360 includes a non-magnetic metal or a non-magnetic metallic alloy. Alternatively, the conductive material portion 360 can include a conductive multilayer stack of non-magnetic layers. In one embodiment, the conductive material portion 360 does not include a material that generates an alternating magnetic field upon application of an electrical current therethrough.

In one embodiment, the conductive material portion 360 can have a homogeneous composition throughout. In one embodiment, the conductive material portion 360 can comprise, and/or consist essentially of, copper, tungsten, ruthenium, chromium, and/or any other non-magnetic metal or a non-magnetic metallic alloy. The thickness of the conductive material portion 360 can be in a range from 20 nm to 200 nm, although lesser and greater thicknesses can also be employed. The conductive material portion 360 is formed over the trailing sidewall of the main pole 220, and directly on a trailing sidewall of the conductive layer stack 350.

Figure 8E:
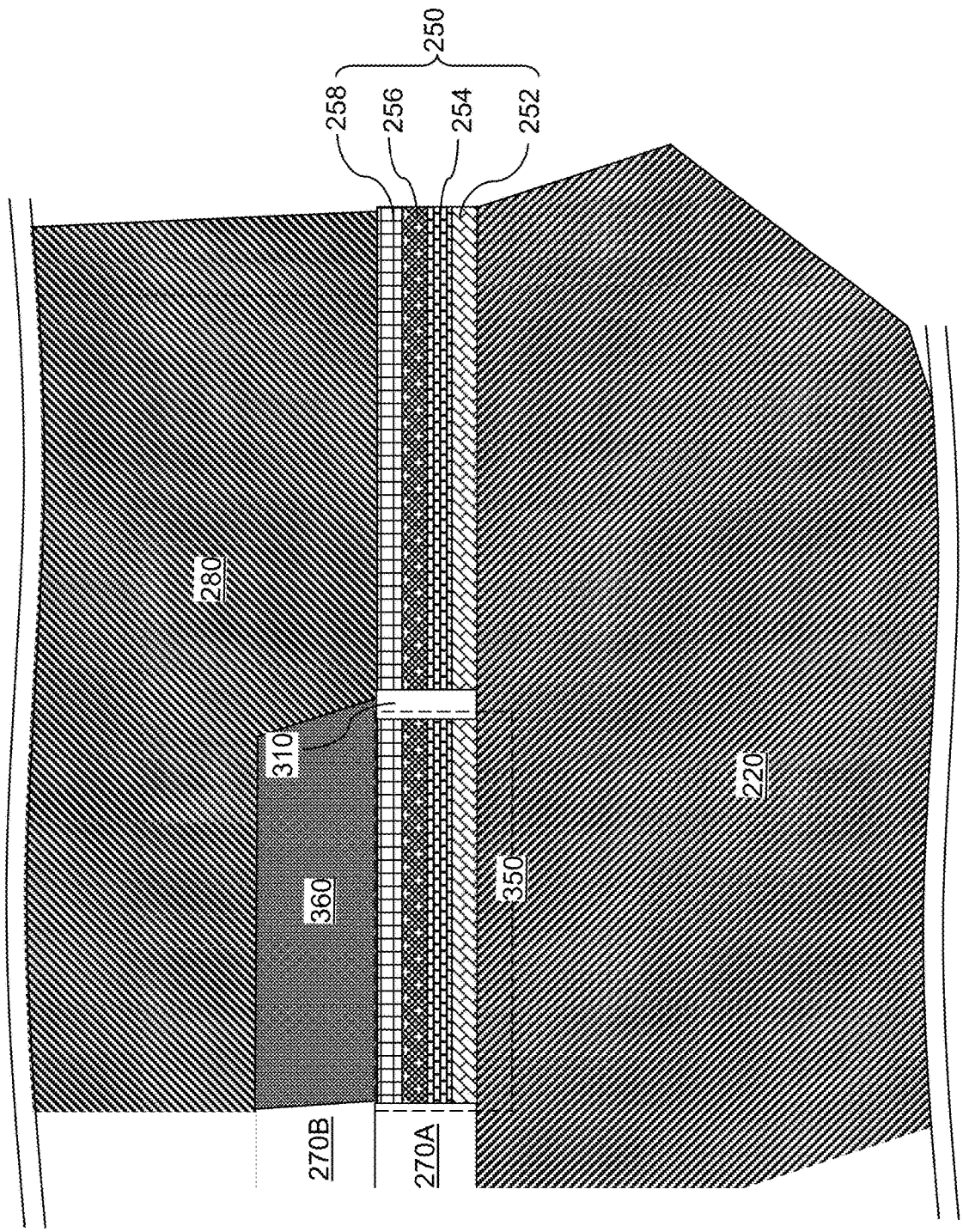

Referring to FIG. 8E, the trailing shield 280 (which is a magnetic shield located on the side of the trailing sidewall of the spin torque oscillator 250 stack) can be formed. The trailing shield 280 can be formed directly on the top surfaces (which are trailing sidewalls) of the conductive material portion 360 and the spin torque oscillator 250 stack by deposition and patterning of a soft magnetic material. Subsequently, additional material layer can be deposited and patterned as needed. For example, components of the magnetic coil 225, additional portions of the insulating material portion 270 and the upper pole 285 can be formed and a recess in a trailing sidewall of the main pole can be formed by ion milling (not shown for clarity).

Figure 8F:
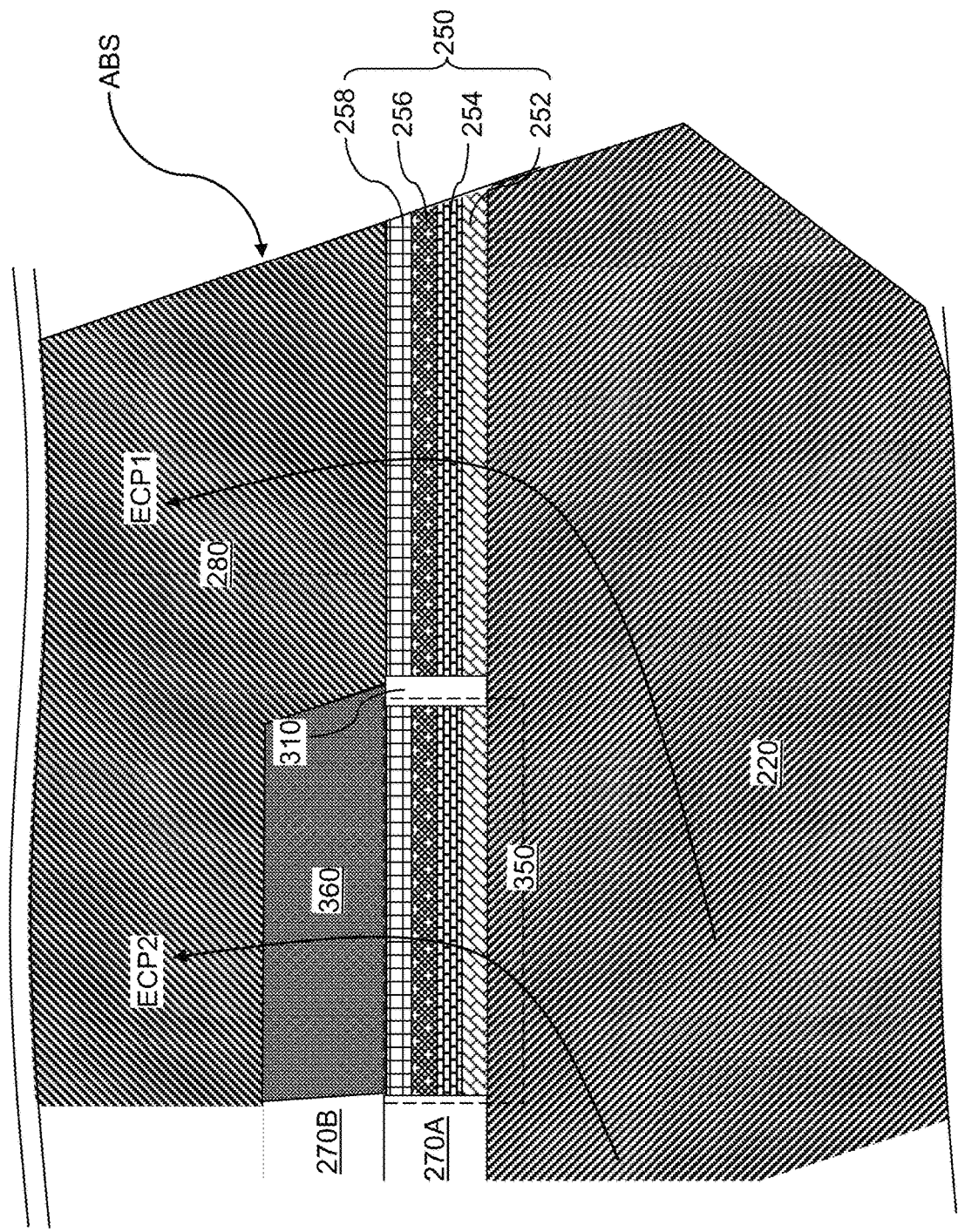

Referring to FIG. 8F, an air bearing surface (ABS) of the magnetic head 600 can be provided by lapping portions of the main pole 220, the spin torque oscillator 250 stack, and the trailing shield 280. As discussed above, the first electrically conductive path ECP1 includes the spin torque oscillator 250 stack, and the second electrically conductive path ECP2 includes the conductive layer stack 350 and the conductive material portion 360.

Figure 9A:
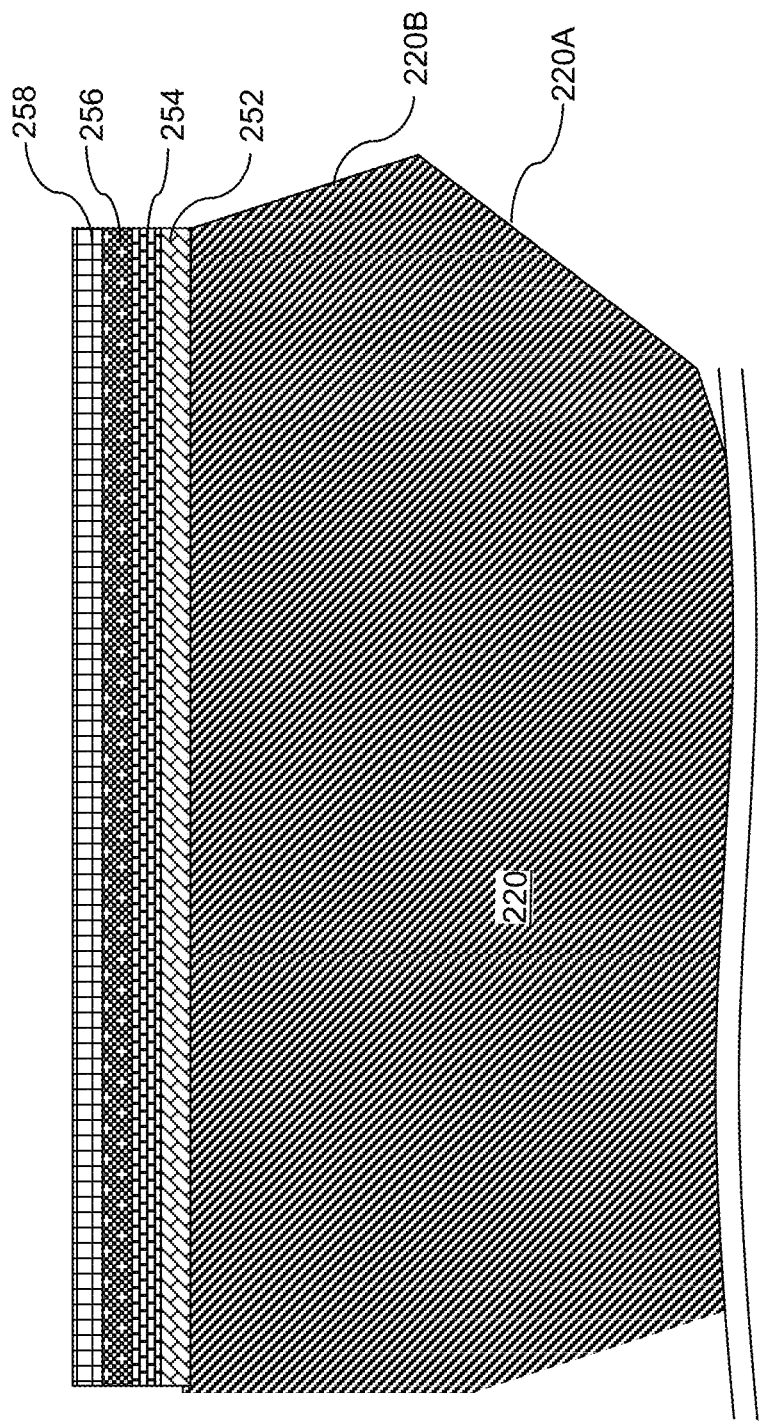

FIGS. 9A-9E illustrate a sequence of processing steps that can be employed to manufacture the second exemplary recording head. Referring to FIG. 9A, an exemplary structure that can be employed to form the second exemplary recording head is shown, which can be the same as the exemplary structure shown in FIG. 8A.

Figure 9B:
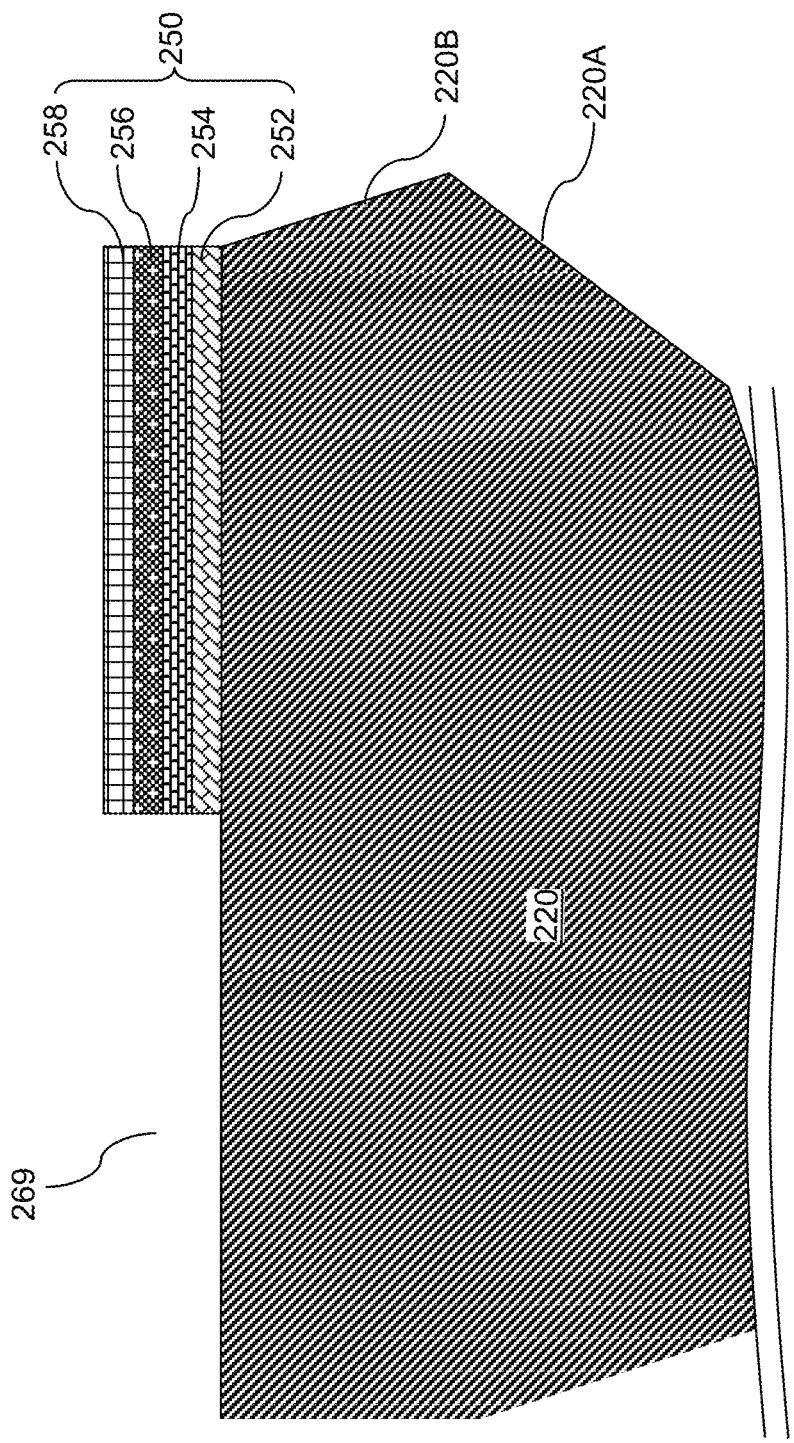

Referring to FIG. 9B, the layer stack of component layers (252, 254, 256, 258) for forming the spin torque oscillator stack can be patterned by a combination of a lithographic patterning process and an etch process. For example, a photoresist layer (not shown) can be applied over the spin torque oscillator 250 stack, and can be lithographically patterned to cover a discrete portion near an edge of the main pole 220 that is proximal to the air bearing surface to be subsequently formed. The pattern in the photoresist layer is transferred to through the layer stack of component layers (252, 254, 256, 258) by the etch process. For example, an ion milling process that employs the patterned photoresist layer as an etch mask can be employed to pattern the layer stack of component layers (252, 254, 256, 258). A continuous remaining portion of the layer stack of component layers (252, 254, 256, 258) located at the air bearing surface side constitutes the spin torque oscillator 250 stack, which is a mesa structure. A field region 269 is provided, which includes a physically exposed top surface of the main pole 220 and is free of remaining portions of the layer stack of component layers (252, 254, 256, 258).

Referring to FIG. 9C, a first electrically conductive, non-magnetic material can be deposited over a physically exposed top surface of the main pole 220 adjacent to the spin torque oscillator 250 stack. For example, a lithographic patterning process can be performed to form a patterned photoresist layer including an opening adjacent to the spin torque oscillator 250 stack. The first conductive material can be deposited in the opening in the photoresist layer, and the photoresist layer can be lifted off. The remaining portion of the first conductive material constitutes a first conductive material portion 340. Alternatively, the first conductive material layer may be deposited as a continuous layer, and can be patterned by a combination of a lithographic patterning process and an etch (e.g., ion milling) process to provide the first conductive material portion 340.

Preferably, but not necessarily, the first conductive material portion 340 includes a non-magnetic metal or a non-magnetic metallic alloy. Alternatively, the first conductive material portion 340 can include a conductive multilayer stack of non-magnetic layers. In one embodiment, the first conductive material portion 340 does not include a material that generates an alternating magnetic field upon application of an electrical current therethrough. In one embodiment, the first conductive material layer includes a non-magnetic conductive material such as copper, ruthenium, chromium, tungsten, another non-magnetic elemental metal, or a non-magnetic alloy thereof.

In one embodiment, the first conductive material portion 340 can contact a sidewall of the spin torque oscillator 250 stack. In one embodiment, the top surface of the first conductive material portion 340 may be planarized. In this case, the top surface of the first conductive material portion 340 can be coplanar with the top surface of the spin torque oscillator 250 stack. In one embodiment, the first conductive material portion 340 can comprise, and/or consist essentially of, copper, tungsten, ruthenium, chromium, and/or any other non-magnetic metal or a non-magnetic metallic alloy. The first conductive material portion 340 is formed directly on a trailing sidewall of the main pole 220.

Figure 9D:
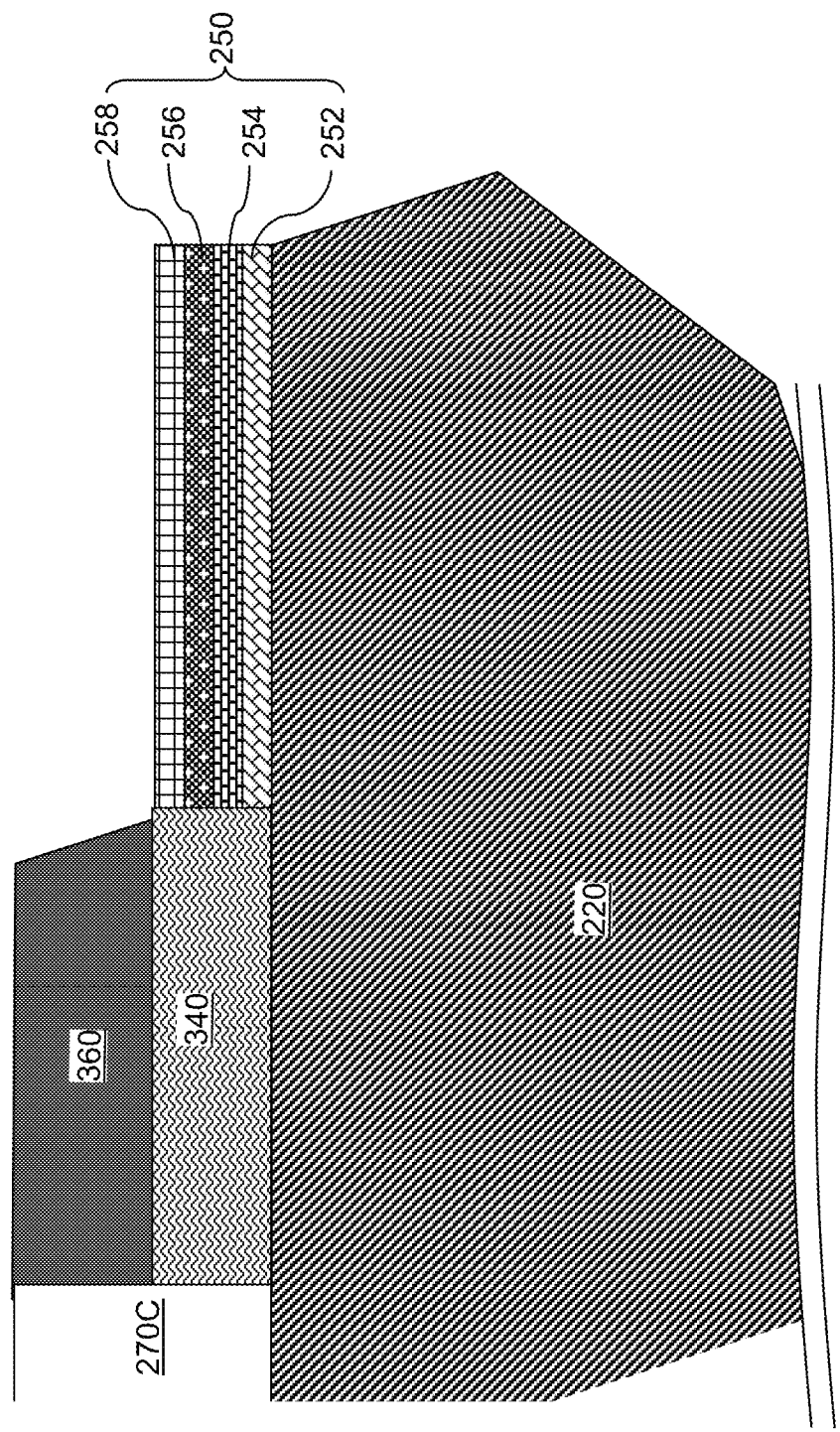

Referring to FIG. 9D, a dielectric material can be deposited in the region that is not covered by the spin torque oscillator 250 stack or the first conductive material portion 340. The dielectric material can be deposited as a continuous material layer, and excess portions of the dielectric material can be removed from above the first conductive material portion 340 and the spin torque oscillator 250 stack by a masked etch process. The remaining portion of the dielectric material constitutes a dielectric material portion 270C, which can be a portion of the insulating material portion 270.

A second electrically conductive, non-magnetic material can be deposited on the first conductive material portion 340. For example, a lithographic patterning process can be performed to form a patterned photoresist layer including an opening overlying the first conductive material portion 340. The second conductive material can be deposited in the opening in the photoresist layer, and the photoresist layer can be lifted off. The remaining portion of the second conductive material constitutes a second conductive material portion 360. Alternatively, the second conductive material layer may be deposited as a continuous layer, and can be patterned by a combination of a lithographic patterning process and an etch (e.g., ion milling) process to provide the second conductive material portion 360.

Preferably but not necessarily, the second conductive material portion 360 includes a non-magnetic metal or a non-magnetic metallic alloy. Alternatively, the second conductive material portion 360 can include a conductive multilayer stack of non-magnetic layers, or a conductive multilayer stack of magnetic layers. In one embodiment, the second conductive material portion 360 does not include a material that generates an alternating magnetic field upon application of an electrical current therethrough. In one embodiment, the second conductive material portion 360 includes a non-magnetic conductive material such as copper, ruthenium, chromium, tungsten, another non-magnetic elemental metal, or a non-magnetic alloy thereof. The second conductive material portion 360 can include the same material as, or a different material from, the first conductive material portion 340. In one embodiment, the second conductive material portion 360 can have a homogeneous composition throughout. In one embodiment, the second conductive material portion 360 can comprise, and/or consist essentially of, copper, tungsten, ruthenium, chromium, and/or any other non-magnetic metal or a non-magnetic metallic alloy. The thickness of the second conductive material portion 360 can be in a range from 20 nm to 200 nm, although lesser and greater thicknesses can also be employed. The second conductive material portion 360 is formed over the main pole 220, and directly on a trailing sidewall of the first non-magnetic conductive material portion 340.

Figure 9E:
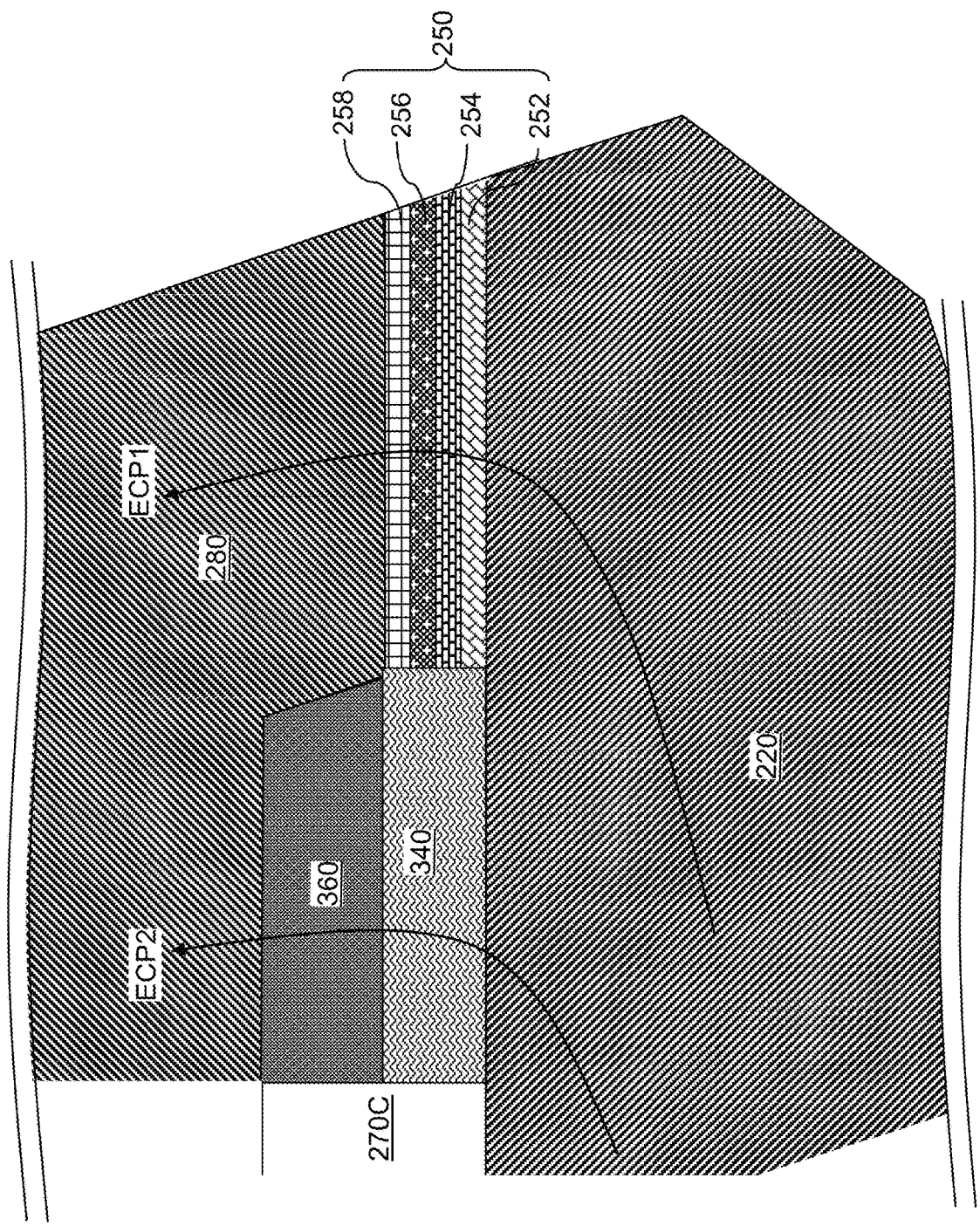

Referring to FIG. 9E, the trailing shield 280 (which is a magnetic shield located on the side of the trailing sidewall of the spin torque oscillator 250 stack) can be formed. The trailing shield 280 can be formed directly on the top surfaces (which are trailing sidewalls) of the conductive material portion 360 and the spin torque oscillator 250 stack by deposition and patterning of a soft magnetic material. Subsequently, additional material layers can be deposited and patterned as needed. For example, components of the magnetic coil 225, additional portions of the insulating material portion 270 and the upper pole 285 can be formed and a recess in a trailing sidewall of the main pole can be formed by ion milling (not shown for clarity).

An air bearing surface (ABS) of the magnetic head 600 can be provided by lapping portions of the main pole 220, the spin torque oscillator 250 stack, and the trailing shield 280. As discussed above, the first electrically conductive path ECP1 includes the spin torque oscillator 250 stack, and the second electrically conductive path ECP2 includes the first and second conductive material portions (340, 360).

Figure 10A:
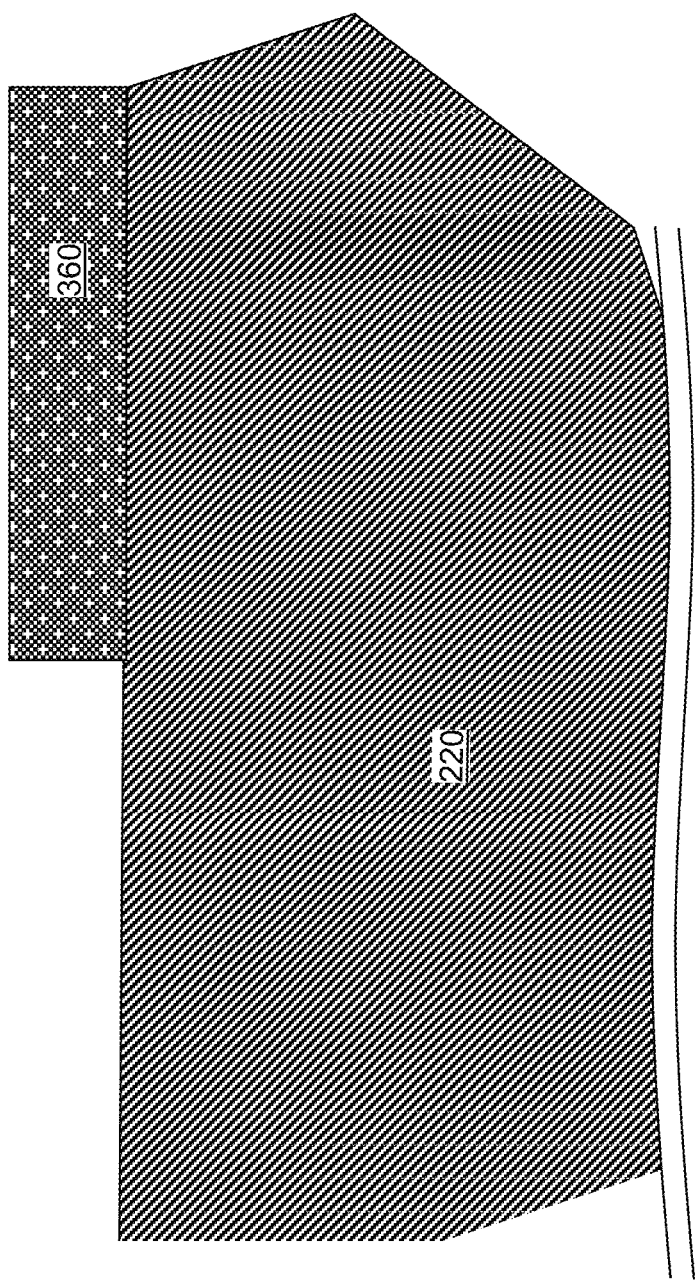
FIGS. 10A-10C are sequential vertical cross-sectional views of a third exemplary structure for manufacture of the third exemplary recording head according to the third embodiment of the present disclosure.
Figure 10B:
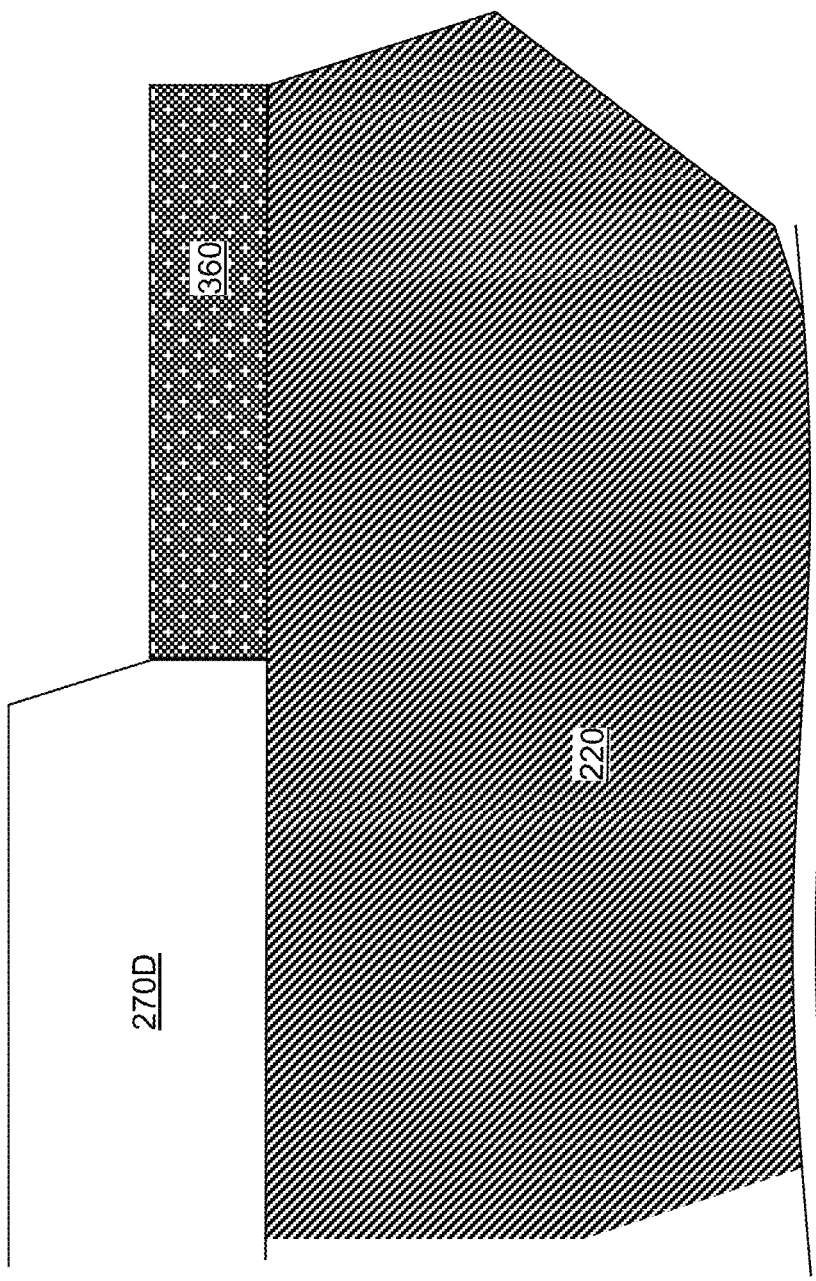
Figure 10C:
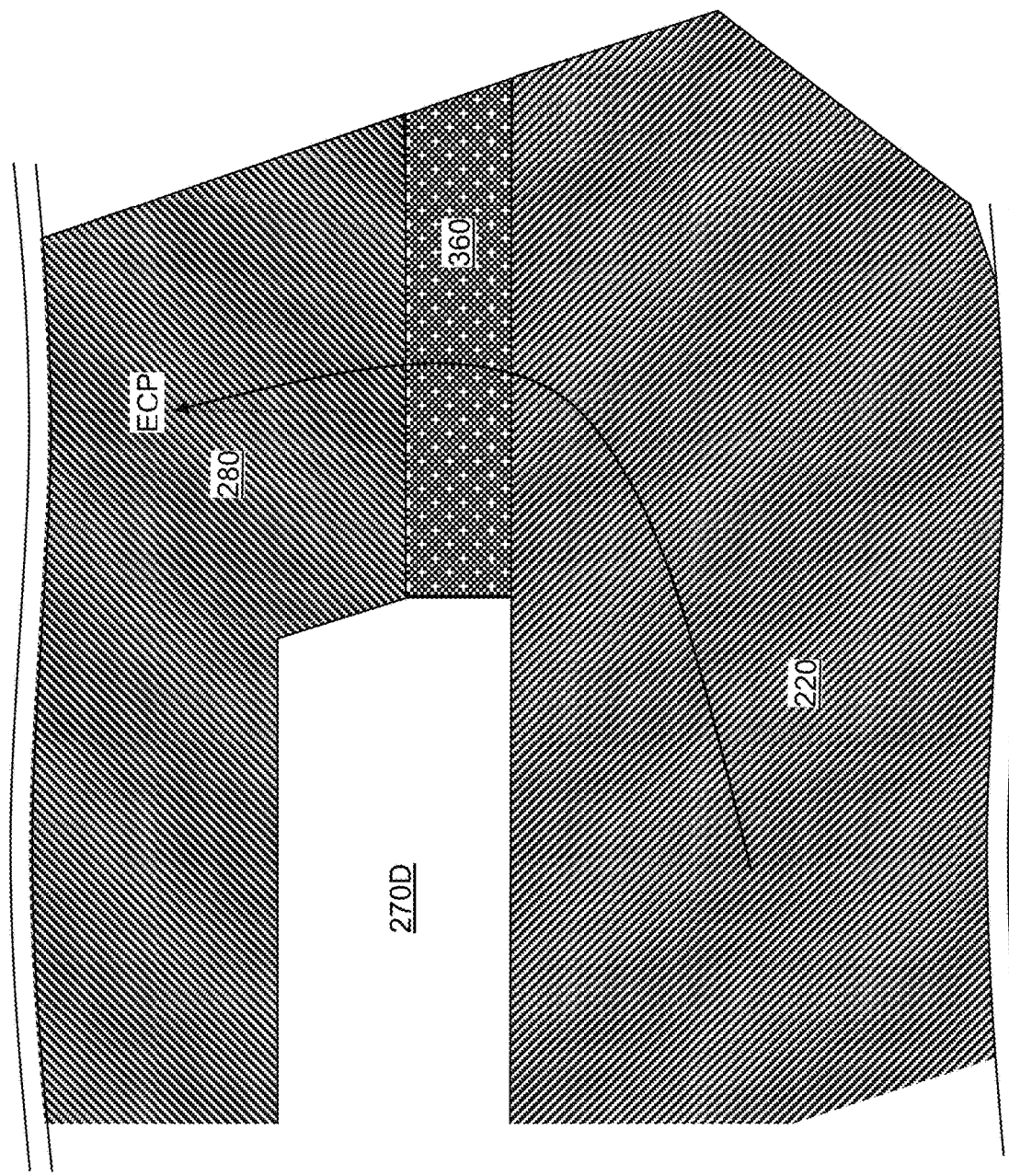

FIGS. 10A-10C illustrate a sequence of processing steps that can be employed to manufacture the third exemplary recording head. Referring to FIG. 10A, an auxiliary pole 202, side magnetic shields 206, and a dielectric material filling a portion of the gap 205 between the main pole 220 and the auxiliary pole 202 and the side magnetic shields 206 are formed over a substrate (not shown). The main pole 220 is subsequently formed within a groove formed in the dielectric material.

Subsequently, an electrically conductive, non-magnetic material can be deposited on the air bearing side of the top surface of the main pole 220. For example, the conductive material layer may be deposited as a continuous layer, and can be patterned by a combination of a lithographic patterning process and an etch (e.g., ion milling) process to provide a conductive material portion 360. Alternatively, the conductive material portion 360 can be formed by a lift-off process. Preferably but not necessarily, the conductive material portion 360 includes a non-magnetic metal or a non-magnetic metallic alloy. Alternatively, the conductive material portion 360 can include a conductive multilayer stack of non-magnetic layers, or a conductive multilayer stack of magnetic layers. In one embodiment, the conductive material portion 360 does not include a material that generates an alternating magnetic field upon application of an electrical current therethrough. In one embodiment, the conductive material portion 360 includes a non-magnetic conductive material such as copper, gold, platinum, ruthenium, chromium, tungsten, another non-magnetic elemental metal, or a non-magnetic alloy thereof. In one embodiment, the conductive material portion 360 can comprise, and/or consist essentially of, copper, gold, platinum, tungsten, ruthenium, chromium, and/or any other non-magnetic metal or a non-magnetic metallic alloy. The conductive material portion 360 is formed directly on a trailing sidewall of the main pole 220.

Referring to FIG. 10B, a dielectric material can be deposited in the region that does not overlap with the conductive material portion 360. The dielectric material can be deposited as a continuous material layer, and excess portions of the dielectric material can be removed from above the conductive material portion 360 by a masked etch process. Alternatively, a patterned mask layer including an opening adjacent to the conductive material portion 360 can be formed. A dielectric material can be deposited within the opening, and the patterned mask layer can be lifted off. The remaining portion of the dielectric material constitutes a dielectric material portion 270D, which can be a portion of the insulating material portion 270. The dielectric material portion 270D includes a dielectric material such as aluminum oxide, silicon oxide, or silicon nitride.

Referring to FIG. 10C, the trailing shield 280 (which is a magnetic shield located on the side of the trailing sidewall of the spin torque oscillator 250 stack) can be formed. The trailing shield 280 can be formed directly on the top surface (which is the trailing sidewall) of the conductive material portion 360 by deposition and patterning of a soft magnetic material. Subsequently, additional material layers can be deposited and patterned as needed. For example, components of the magnetic coil 225, additional portions of the insulating material portion 270 and the upper pole 285 can be formed and a recess in a trailing sidewall of the main pole can be formed by ion milling (not shown for clarity).

An air bearing surface (ABS) of the magnetic head 600 can be provided by lapping portions of the main pole 220, the conductive material portion 360, and the magnetic shield (i.e., the trailing shield 280). As discussed above, the electrically conductive path ECP includes the magnetic conductive material portion 360.

The various recording heads of the present disclosure provide advantages over prior art recording heads by utilizing Ampere's field generated by electrical current through a conductive material portion 360. Specifically, the electrical current flowing between the main pole 220 and the trailing shield 280 generates the Ampere's field, which is employed to achieve significant areal density capability (ADC) gain. The areal density capability from the Ampere's field can be significant.

Figure 11:
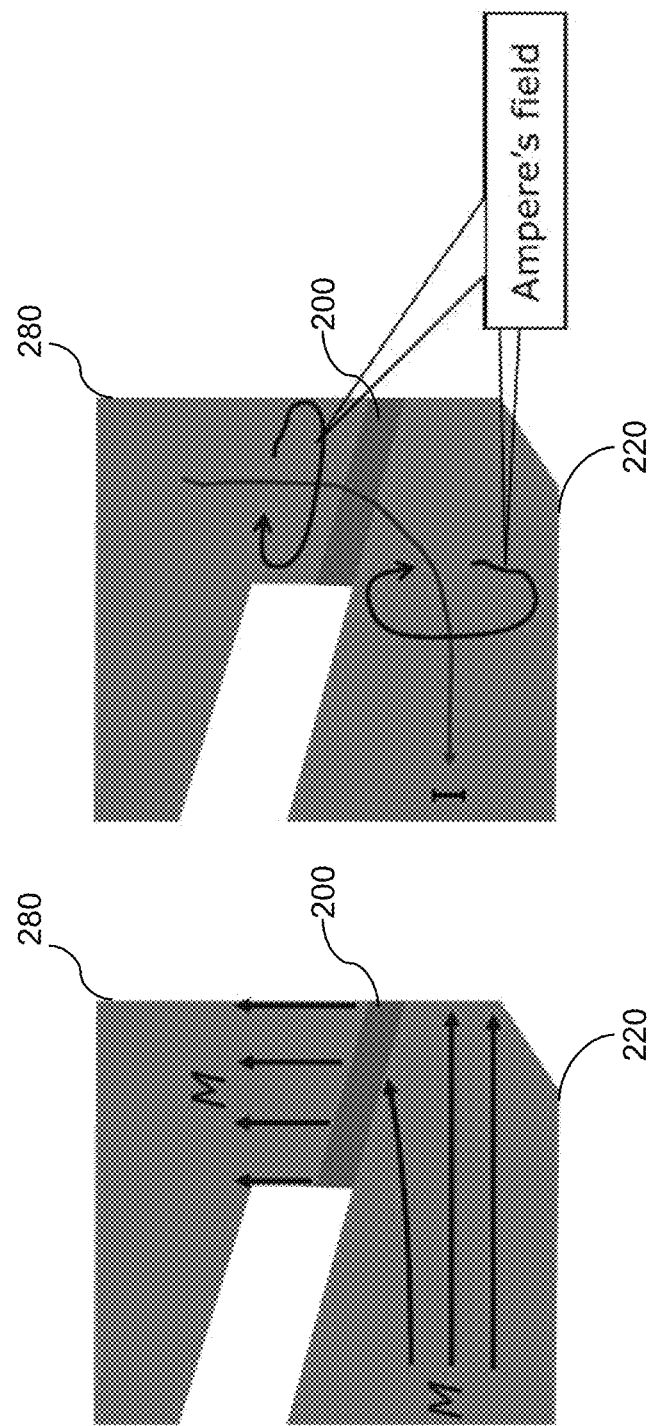
FIG. 11 shows magnetization M, bias current I, and the current induced Ampere's field in the main pole and in the trailing shield in the vicinity of a trailing gap according to an embodiment of the present disclosure.

FIG. 11 shows magnetization M, bias current I, and the current induced Ampere's field in the main pole 220 and in the trailing shield 280 in the vicinity of a trailing gap 222, which includes the record element 200 containing the conductive material portion 360, for the third exemplary recording head. The principle of operation illustrated in FIG. 11 applies equally to the second electrically conductive path ECP2 of the first and second exemplary recording heads.

Referring back to FIGS. 5A, 5B, 6, 7A, and 7B, the main pole 220 and the trailing magnetic shield 280 can be in direct electric contact through the conducting trailing gap 222 containing the record element 200, which can consist of the conductive material portion 360 as in the third embodiment, or can include the conductive material portion 360 and the spin torque oscillator 250 stack and additional components as in the first and second embodiments. The main pole 220 and the trailing shield 280 are otherwise electrically insulated and isolated from each other. The main pole 220 constitutes a first electrode and the trailing shield 280/upper pole 285 constitutes a second electrode. When an electrical bias voltage is applied across the first and second electrodes, electrical current flows from the main pole 220 into the trailing shield 280, or vice versa through the record element 200.

In one embodiment, the insulating material layer 272 can be a thin dielectric layer such as an aluminum oxide layer, which is provided in the back gap area between end portions of the first electrode and the second electrode. The insulating material layer 272 can have a thickness in a range from 10 nm to 100 nm, such as from 20 nm to 50 nm, although lesser and greater thicknesses can also be employed. Additional insulating material can be provided in order to provide electrical isolation between the first electrode (as embodied as the main pole 220) and the second electrode (as embodied as the trailing shield 280).

During operation of the recording heads of the present disclosure, an electrical bias voltage is applied across the main pole 220 and the trailing shield 280. The electrical bias voltage induces electrical current between the main pole 220 and the trailing shield 280. This electrical current improves performance of the recording head with a higher ADC, as elaborated below. The electrical bias voltage across the main pole 220 and the trailing shield 280 can be a direct current (DC) bias voltage (with either polarity), or can be an alternating current (AC) bias voltage. In the case of an AC bias voltage, it is preferred to have a waveform that follows the waveform of the write current through the magnetic coil 225 per the bits to be written, either in-phase, or out of phase. In other words, an AC bias voltage can be applied as a pulse only during the transition in the magnetization during the recording process.

Figure 12:
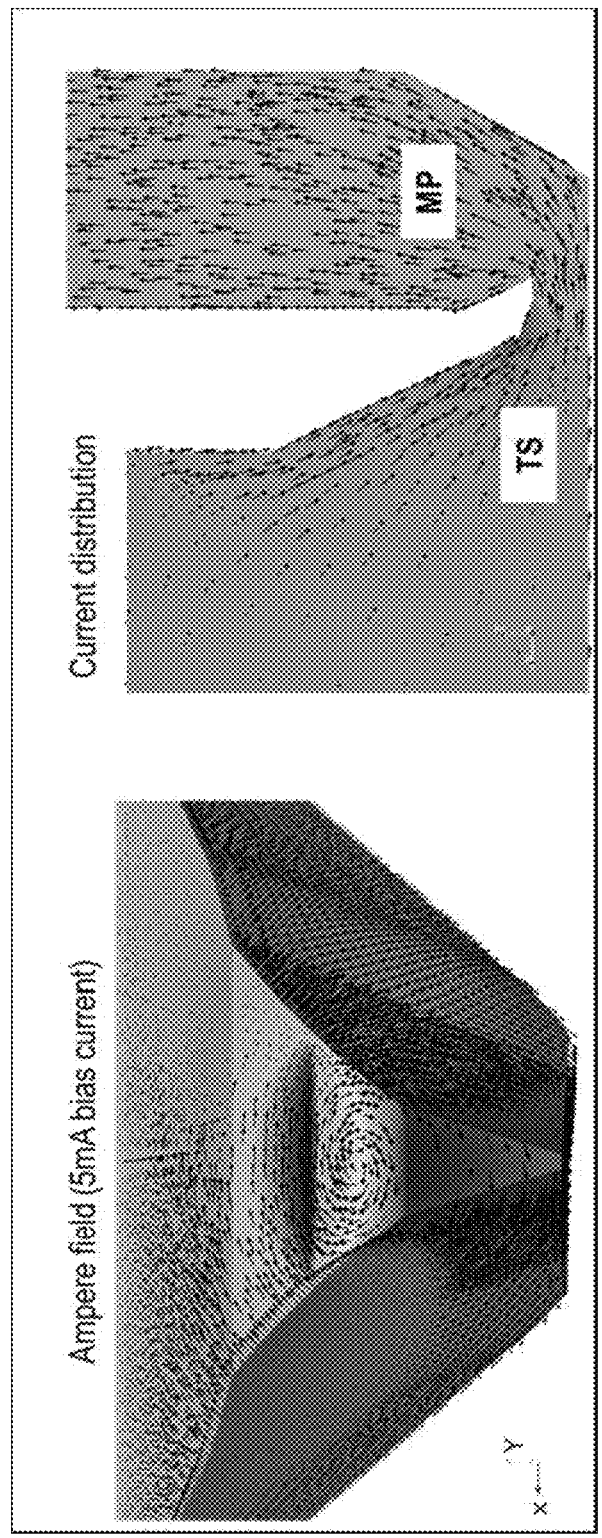
FIG. 12 shows finite element model (FEM) simulation results of the bias current distribution and the Ampere's field (MP) produced by 5 mA of the bias current through the main pole according to an embodiment of the present disclosure.

During operation of the recording heads of the present disclosure, an electric current flows from the main pole 220 into the trailing shield 280, or vice versa. As illustrated in FIG. 12, this current produces an Ampere field inside both the main pole 220 and the trailing shield 280, as well as in the recording media. FIG. 12 shows finite element model (FEM) simulation results of the bias current distribution and the Ampere's field (MP) produced by 5 mA of the bias current through the main pole according to an embodiment of the present disclosure. For a bias current of 5 mA (which corresponds to a bias voltage of 150 mV and a total resistance of 30 Ohm), a circular field inside the main pole 220 is clearly visible, with magnitude of ~100 Oe at the ABS side, and ~200 Oe in the back, which is consistent with the current density distribution (higher in the back and lower at the ABS).

Because of the small dimension defined by the bump position, the high current density is mainly concentrated inside the main pole 220 and the trailing shield 280 in the vicinity of the trailing gap 222 area, which is in the range of approximately from 100 nm to 150 nm into the air bearing surface (ABS). According to Ampere's law, this current will produce a circular magnetic field that is in the direction transverse to that of the current. Since the current direction is substantially the same as the direction of the magnetization of the main pole 220 and the trailing shield 280, this Ampere field is also transverse to the magnetization, thus producing a transverse magnetization component with respect to the flux flow direction in the main pole 220 and the trailing shield 280 around the trailing gap 222. This will in turn make faster the flux reversal in the main pole 220 and trailing shield 280.

In addition to the current induced Ampere field inside the recording head that makes the magnetization switching faster, the Ampere field also has other non-limiting benefits. One benefit is that the Ampere field could change the magnetization direction of the main pole and the trailing shield in the vicinity of the trailing gap, such that the flux shunt from the main pole 220 into the trailing shield 280 is reduced, leading to higher field (thus higher overwrite) in the media. Another benefit is that the media will also experience this Ampere's field.

Although the foregoing refers to particular preferred embodiments, it will be understood that the disclosure is not so limited. It will occur to those of ordinary skill in the art that various modifications may be made to the disclosed embodiments and that such modifications are intended to be within the scope of the disclosure. Where an embodiment employing a particular structure and/or configuration is illustrated in the present disclosure, it is understood that the present disclosure may be practiced with any other compatible structures and/or configurations that are functionally equivalent provided that such substitutions are not explicitly forbidden or otherwise known to be impossible to one of ordinary skill in the art. All of the publications, patent applications and patents cited herein are incorporated herein by reference in their entirety.

What is claimed is:

1. A magnetic head, comprising:
    a main pole, wherein the main pole has a surface at an air bearing surface (ABS);
    a trailing shield, wherein the trailing shield has a surface at the ABS;
    an electrically conductive, non-magnetic material portion disposed between the main pole and the trailing shield, wherein the electrically conductive, non-magnetic material portion is recessed from the ABS; and
    a spin torque oscillator coupled between the main pole and the trailing shield, wherein the spin torque oscillator is spaced from the electrically conductive, non-magnetic material portion.

2. The magnetic head of claim 1, wherein the electrically conductive, non-magnetic material portion comprises copper, tungsten, ruthenium, or chromium.

3. The magnetic head of claim 1, wherein the electrically conductive, non-magnetic material portion comprises a non-magnetic metal.

4. The magnetic head of claim 1, wherein the electrically conductive, non-magnetic material portion comprises a non-magnetic metal alloy.

5. A hard disk drive comprising: a magnetic head, comprising:
    a main pole, wherein the main pole has a surface at an air bearing surface (ABS);
    a trailing shield, wherein the trailing shield has a surface at the ABS;
    an electrically conductive, non-magnetic material portion disposed between the main pole and the trailing shield, wherein the electrically conductive, non-magnetic material portion is recessed from the ABS; and
    a spin torque oscillator coupled between the main pole and the trailing shield, wherein the spin torque oscillator is spaced from the electrically conductive, non-magnetic material portion.

6. A magnetic head, comprising:
    a main pole, wherein the main pole has a surface at an air bearing surface (ABS);
    a trailing shield, wherein the trailing shield has a surface at the ABS;
    an electrically conductive, non-magnetic material portion disposed between the main pole and the trailing shield, wherein the electrically conductive, non-magnetic material portion is recessed from the ABS; and
    a spin torque oscillator coupled between the main pole and the trailing shield, wherein the spin torque oscillator has a surface at the ABS, and wherein the spin torque oscillator is spaced from the electrically conductive, non-magnetic material portion.

7. The magnetic head of claim 6, wherein the spin torque oscillator comprises:
    a non-magnetic conductive seed layer;
    a spin polarized layer; and
    a field generating layer.

8. The magnetic head of claim 7, wherein the non-magnetic conductive seed layer is disposed on the main pole.

9. The magnetic head of claim 7, wherein the non-magnetic conductive seed layer comprises Cr, Ru, W, or Cu.

10. The magnetic head of claim 7, wherein the spin polarized layer comprises a nickel-iron alloy.

11. The magnetic head of claim 7, further comprising a non-magnetic conductive spacer layer disposed between the spin polarized layer and the field generating layer.

12. The magnetic head of claim 11, wherein the non-magnetic conductive spacer layer comprises Cu.

13. A hard disk drive comprising: a magnetic head, comprising:
    a main pole, wherein the main pole has a surface at an air bearing surface (ABS);
    a trailing shield, wherein the trailing shield has a surface at the ABS;

an electrically conductive, non-magnetic material portion disposed between the main pole and the trailing shield, wherein the electrically conductive, non-magnetic material portion is recessed from the ABS; and a spin torque oscillator coupled between the main pole and the trailing shield, wherein the spin torque oscillator has a surface at the ABS, and wherein the spin torque oscillator is spaced from the electrically conductive, non-magnetic material portion.

14. A magnetic head, comprising:

a main pole, wherein the main pole has a surface at an air bearing surface (ABS);

a trailing shield, wherein the trailing shield has a surface at the ABS;

an electrically conductive, non-magnetic material portion disposed between the main pole and the trailing shield, wherein the electrically conductive, non-magnetic material portion is recessed from the ABS, wherein the electrically conductive, non-magnetic material portion is in contact with the trailing shield; and a spin torque oscillator coupled between the main pole and the trailing shield, wherein the spin torque oscillator is spaced from the electrically conductive, non-magnetic material portion.

15. The magnetic head of claim 14, wherein the electrically conductive, non-magnetic material portion is spaced from the main pole.

16. The magnetic head of claim 14, further comprising a conductive layer stack coupled between the main pole and the electrically conductive, non-magnetic material portion.

17. The magnetic head of claim 16, further comprising a dielectric spacer disposed between the conductive layer stack and the spin torque oscillator.

18. The magnetic head of claim 17, wherein the spin torque oscillator has a surface disposed at the ABS.

19. A hard disk drive comprising: a magnetic head, comprising:

a main pole, wherein the main pole has a surface at an air bearing surface (ABS);

a trailing shield, wherein the trailing shield has a surface at the ABS;

an electrically conductive, non-magnetic material portion disposed between the main pole and the trailing shield, wherein the electrically conductive, non-magnetic material portion is recessed from the ABS, wherein the electrically conductive, non-magnetic material portion is in contact with the trailing shield; and a spin torque oscillator coupled between the main pole and the trailing shield, wherein the spin torque oscillator is spaced from the electrically conductive, non-magnetic material portion.

* * * * *